(12) United States Patent
Hayashi

(10) Patent No.: US 11,011,740 B2
(45) Date of Patent: May 18, 2021

(54) POSITIVE ELECTRODE MATERIAL, POSITIVE ELECTRODE, BATTERY, BATTERY PACK, ELECTRONIC DEVICE, ELECTRIC VEHICLE, ELECTRIC STORAGE DEVICE, AND ELECTRIC POWER SYSTEM

(71) Applicant: MURATA MANUFACTURING CO., LTD., Kyoto (JP)

(72) Inventor: Naoki Hayashi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 72 days.

(21) Appl. No.: 16/365,151

(22) Filed: Mar. 26, 2019

(65) Prior Publication Data

US 2019/0221831 A1 Jul. 18, 2019

Related U.S. Application Data

(63) Continuation of application No. PCT/JP2017/035518, filed on Sep. 29, 2017.

(30) Foreign Application Priority Data

Oct. 28, 2016 (JP) .............................. JP2016-212235

(51) Int. Cl.
*H01M 4/131* (2010.01)
*H01M 4/525* (2010.01)
*H01M 10/0525* (2010.01)
*H01M 4/36* (2006.01)
(Continued)

(52) U.S. Cl.
CPC ............ *H01M 4/131* (2013.01); *C01G 51/42* (2013.01); *H01M 4/36* (2013.01); *H01M 4/364* (2013.01);
(Continued)

(58) Field of Classification Search
CPC ........ H01M 4/131; H01M 4/36; H01M 4/364; H01M 4/505; H01M 4/525; H01M 4/62; H01M 10/052; H01M 10/0525; H01M 10/0587; H01M 2004/028; H01M 2220/20; C01G 51/42; C01P 2002/72; Y02E 60/10; Y02T 10/70
See application file for complete search history.

(56) References Cited

U.S. PATENT DOCUMENTS

2016/0380263 A1* 12/2016 Nakayama ............ H01M 4/525
429/223
2017/0170475 A1 6/2017 Niwata et al.

FOREIGN PATENT DOCUMENTS

JP H06290799 A 10/1994
JP 2014130782 A 7/2014
(Continued)

OTHER PUBLICATIONS

Thiel, J. P., Chiang, C. K., & Poeppelmeier, K. (1993). Structure of LiAl2(OH)7 2H2O. Chemistry of Materials, 5(3), 297-304. https://doi.org/10.1021/cm00027a011 (Year: 1993).*

(Continued)

*Primary Examiner* — Christopher P Domone
*Assistant Examiner* — Kimberly Wyluda
(74) *Attorney, Agent, or Firm* — K&L Gates LLP

(57) ABSTRACT

A battery includes a positive electrode, a negative electrode, and an electrolyte. The positive electrode includes $Li_xAl_2(OH)_{7-y} \cdot zH_2O$ where $0.9 < x < 1.1$, $-0.1 < y < 0.1$, $0 \leq z < 2.1$.

14 Claims, 7 Drawing Sheets

(51) Int. Cl.
  *H01M 4/02*     (2006.01)
  *H01M 4/505*    (2010.01)
  *H01M 10/0587*  (2010.01)
  *C01G 51/00*    (2006.01)
  *H01M 10/052*   (2010.01)
  *H01M 4/62*     (2006.01)

(52) U.S. Cl.
  CPC ........... *H01M 4/505* (2013.01); *H01M 4/525* (2013.01); *H01M 4/62* (2013.01); *H01M 10/052* (2013.01); *H01M 10/0525* (2013.01); *H01M 10/0587* (2013.01); *C01P 2002/72* (2013.01); *H01M 2004/028* (2013.01); *H01M 2220/20* (2013.01); *Y02E 60/10* (2013.01); *Y02T 10/70* (2013.01)

(56) References Cited

FOREIGN PATENT DOCUMENTS

| | | | |
|---|---|---|---|
| JP | 2015069958 A | | 4/2015 |
| WO | 2015111740 A1 | | 7/2015 |
| WO | WO-2015111740 A1 | * | 7/2015 ............ H01M 4/366 |
| WO | 2016017071 A1 | | 2/2016 |
| WO | 2016129629 A1 | | 8/2016 |

OTHER PUBLICATIONS

International Search Report for Application No. PCT/JP2017/035518, dated Nov. 28, 2017.

* cited by examiner

POSITIVE ELECTRODE MATERIAL, POSITIVE ELECTRODE, BATTERY, BATTERY PACK, ELECTRONIC DEVICE, ELECTRIC VEHICLE, ELECTRIC STORAGE DEVICE, AND ELECTRIC POWER SYSTEM

CROSS REFERENCE TO RELATED APPLICATIONS

The present application is a continuation of PCT patent application no. PCT/JP2017/035518, filed on Sep. 29, 2017, which claims priority to Japanese patent application no. JP2016-212235 filed on Oct. 28, 2016, the entire contents of which are being incorporated herein by reference.

BACKGROUND

The present technology generally relates to a positive electrode material, a positive electrode, a battery, a battery pack, an electronic device, an electric vehicle, an electric storage device, and an electric power system.

There is a possibility that a battery may cause thermal runaway when the positive electrode and the negative electrode are short-circuited, and batteries are thus desired which are excellent in thermal stability.

In addition, the thermal stability of batteries is increasingly important due to the recent increase in single cell (one battery) capacity and the increase in charging voltage for improving the unit cell capacity.

SUMMARY

An object of the present technology is to provide a positive electrode material, a positive electrode, and a battery capable of improving the thermal stability of the battery, and a battery pack, an electronic device, an electric vehicle, an electric storage device, and an electric power system including the battery.

In order to resolve the challenges described above, a battery is provided according to an embodiment of the present technology. The battery includes a positive electrode, a negative electrode, and an electrolyte, where the positive electrode includes $Li_xAl_2(OH)_{7-y} \cdot zH_2O$ (0.9<x<1.1, −0.1<y<0.1, 0≤z<2.1).

According to an embodiment of the present technology, a battery is provided. The battery includes a positive electrode, a negative electrode, and an electrolyte, where the positive electrode has at least a first crystallinity peak with a first diffraction angle 2θ at 23.5°±1°, and a second crystallinity peak with a second diffraction angle 2θ at 36.0°±1° in a powder X-ray diffraction measurement.

A positive electrode material according to an embodiment of the present technology includes $Li_xAl_2(OH)_{7-y} \cdot zH_2O$ (0.9<x<1.1, −0.1<y<0.1, 0≤z<2.1).

A positive electrode according to an embodiment of the present technology includes $Li_xAl_2(OH)_{7-y} \cdot zH_2O$ (0.9<x<1.1, −0.1<y<0.1, 0≤z<2.1).

A battery pack, an electronic device, an electric vehicle, an electric storage device, and an electric power system according to the present technology include any of the batteries described herein.

According to the present technology, the thermal stability of the battery can be improved.

It should be noted that the effects described herein are not necessarily to be considered limited, and other suitable properties relating to the present technology may be realized and as further described.

DETAILED DESCRIPTION

Figure 1:
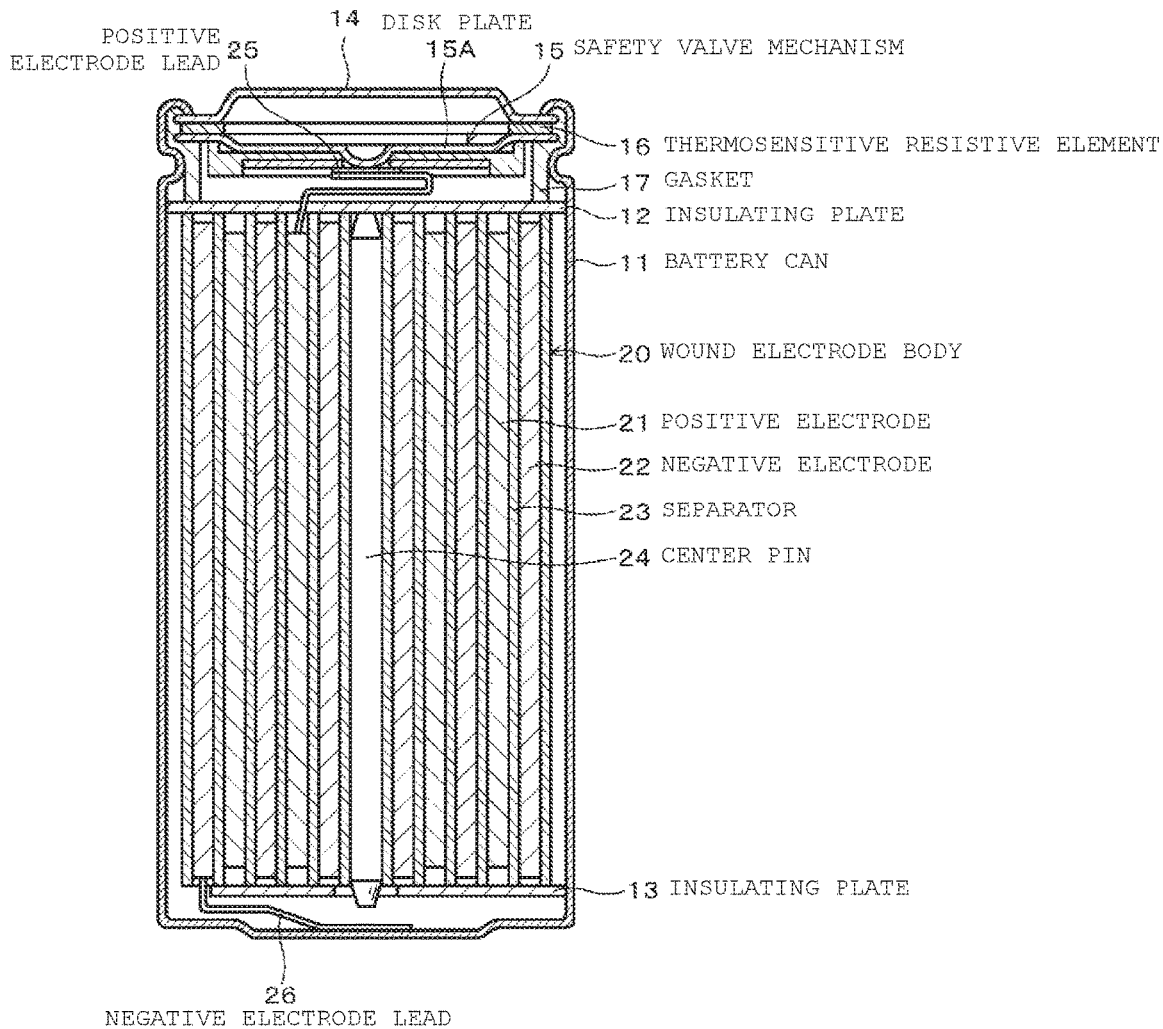
FIG. 1 is a cross-sectional view illustrating an example of the configuration of a non-aqueous electrolyte secondary battery according to an embodiment of the present technology.

As described herein, the present disclosure will be described based on examples with reference to the drawings, but the present disclosure is not to be considered limited to the examples, and various numerical values and materials in the examples are considered by way of example.

The positive electrode material according to the first embodiment of the present technology includes a positive electrode active material capable of occluding and releasing lithium that is an electrode reactant, and $Li_xAl_2(OH)_{7-y} \cdot zH_2O$ (0.9<x<1.1, −0.1<y<0.1, 0≤z<2.1). The positive electrode active material is a powder composed of positive electrode active material particles. The $Li_xAl_2(OH)_{7-y} \cdot zH_2O$ at least partially covers the surfaces of the positive electrode active material particles. More specifically, the $Li_xAl_2(OH)_{7-y} \cdot zH_2O$ may partially cover the surfaces of the positive electrode active material particles, or may cover the entire surfaces of the positive electrode active material particles. However, from the viewpoint of improving the thermal stability of the positive electrode active material, it is preferable to cover the entire surfaces of the positive electrode active material particles.

The positive electrode material may further include, in addition to $Li_xAl_2(OH)_{7-y} \cdot zH_2O$ covering at least partially the surfaces of the positive electrode active material particles, $Li_xAl_2(OH)_{7-y} \cdot zH_2O$ separately from the positive electrode active material particles. More specifically, the positive electrode material may be a mixture including: the positive electrode active material particles with surfaces covered with $Li_xAl_2(OH)_{7-y} \cdot zH_2O$; and the $Li_xAl_2(OH)_{7-y} \cdot zH_2O$ present without covering the surfaces of the positive electrode active material particles.

Alternatively, the positive electrode material may include, in place of $Li_xAl_2(OH)_{7-y} \cdot zH_2O$ covering at least partially the surfaces of the positive electrode active material particles, $Li_xAl_2(OH)_{7-y} \cdot zH_2O$ separately from the positive electrode active material particles. More specifically, the positive electrode material may be a mixture including: the positive electrode active material particles with surfaces covered with no $Li_xAl_2(OH)_{7-y} \cdot zH_2O$; and the $Li_xAl_2(OH)_{7-y} \cdot zH_2O$ present without covering the surfaces of the positive electrode active material particles.

The positive electrode material has, in a powder X-ray diffraction measurement, at least a crystallinity peak at which the diffraction angle 2θ appears at 23.5°±1° and a crystallinity peak at which the diffraction angle 2θ appears at 36.0°±1°. These crystallinity peaks are peaks derived from $Li_xAl_2(OH)_{7-y} \cdot zH_2O$. Therefore, checking whether the positive electrode material has these crystal peaks or not by powder X-ray diffraction measurement can confirm whether the positive electrode material contains $Li_xAl_2(OH)_{7-y} \cdot zH_2O$ or not. As described above, the $Li_xAl_2(OH)_{7-y} \cdot zH_2O$ has crystallinity, and the crystallinity has the characteristics of, for example, with respect to a half value width of 0.08° for a peak of $LiCo_{0.98}Al_{0.01}Mg_{0.01}O_2$ that appears at 19°±1°, a half value width of 0° to 1.9° for a peak that appears at 23.5°±1° and a half value width of 0° to 1.6° for a peak that appears at 36.0°±1° (see FIGS. 8A and 8B).

The content of $Li_xAl_2(OH)_{7-y} \cdot zH_2O$ with respect to the positive electrode active material is preferably 0.05% by mass or more and 3% by mass or less. When the content of the material is less than 0.05% by mass, there is a possibility of decreasing the effect of suppressing the heat generation of the positive electrode active material. On the other hand, when the content of the material exceeds 3% by mass, there is a possibility of decreasing the discharge capacity and the cycle characteristics. The content of $Li_xAl_2(OH)_{7-y} \cdot zH_2O$ can be quantified by using XRD, through the use of only $Li_xAl_2(OH)_{7-y} \cdot zH_2O$ as a calibration curve. For example, the peak value for 1 g of the test object can be compared with the peak value for 1 g of only the $Li_xAl_2(OH)_{7-y} \cdot zH_2O$, thereby quantifying the content from the peak ratio.

As the positive electrode active material capable of occluding and releasing lithium, a lithium containing compound is suitable, for example, such as a lithium oxide, a lithium phosphorus oxide, a lithium sulfide or an intercalation compound containing lithium, and two or more thereof may be used in mixture. In order to increase the energy density, a lithium composite oxide containing lithium, a transition metal element, and oxygen (O) is preferred. Examples of such a lithium composite oxide include, for example, a lithium composite oxide that has a layered rock salt structure as represented by Formula (A), and a lithium composite phosphate that has an olivine-type structure as represented by Formula (B). The lithium composite oxide more preferably contains at least one selected from the group consisting of cobalt (Co), nickel (Ni), manganese (Mn), and iron (Fe) as the transition metal element. Examples of such a lithium composite oxide include, for example, a lithium composite oxide that has a layered rock salt structure as represented by Formula (C), Formula (D) or Formula (E), a lithium composite oxide that has a spinel-type structure as represented by Formula (F), and a lithium composite phosphate that has an olivine-type structure represented by Formula (G), and specifically, $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), and $Li_eFePO_4$ (e≈1).

$$Li_pNi_{(1-r)}Mn_qM1_rO_{(2-y)}X_z \quad (A)$$

(In Formula (A), M1 represents at least one element selected from Group 2 to Group 15 excluding nickel and manganese. X represents at least one of Group 16 elements and Group 17 elements excluding oxygen. p, q, y and z represent values within the ranges of 0≤p≤1.5, 0≤q≤1.0, 0≤r≤1.0, −0.10≤y≤0.20, and 0≤z≤0.2.)

$$Li_aM2_bPO_4 \quad (B)$$

(In Formula (B), M2 represents at least one element selected from Group 2 to Group 15 elements. a and b represent values within the ranges of 0≤a≤2.0 and 0.5≤b≤2.0.)

$$Li_fMn_{(1-g-h)}Ni_gM3_hO_{(2-j)}F_k \quad (A)$$

(In Formula (C), M3 represents at least one element from the group consisting of cobalt, magnesium (Mg), aluminum (Al), boron (B), titanium (Ti), vanadium (V), chromium (Cr), iron, copper (Cu), zinc (Zn), zirconium (Zr), molybdenum (Mo), tin (Sn), calcium (Ca), strontium (Sr) and tungsten (W). f, g, h, j and k represent values within the ranges of 0.8≤f≤1.2, 0<g<0.5, 0≤h≤0.5, g+h<1, −0.1≤j≤0.2, and 0≤k≤0.1. It is to be noted that the composition of lithium varies depending on the state of charge/discharge, and the value of f represents a value in a fully discharged state.)

$$Li_mNi_{(1-n)}M4_nO_{(2-p)}F_q \quad (D)$$

(In Formula (D), M4 represents at least one from the group consisting of cobalt, manganese, magnesium, aluminum, boron, titanium, vanadium, chromium, iron, copper, zinc, molybdenum, tin, calcium, strontium and tungsten. m, n, p, and q represent values within the ranges of 0.8≤m≤1.2, 0.005≤n≤0.5, −0.1≤p≤0.2, and 0≤q≤0.1. It is to be noted that the composition of lithium varies depending on the state of charge/discharge, and the value of m represents a value in a fully discharged state.)

$$Li_rCo_{(1-s)}M5_sO_{(2-t)}F_u \quad (E)$$

(In Formula (E), M5 represents at least one from the group consisting of nickel, manganese, magnesium, aluminum, boron, titanium, vanadium, chromium, iron, copper, zinc, molybdenum, tin, calcium, strontium and tungsten. r, s, t and u represents values within the ranges of 0.8≤r≤1.2, 0≤s<0.5, −0.1≤t≤0.2, and 0≤u≤0.1. The composition of lithium varies depending on the state of charge and discharge, and the value of r represents the value in a fully discharged state.)

$$Li_vMn_{2-w}M6_wO_xF_y \quad (F)$$

(In Formula (F), M6 represents at least one from the group consisting of cobalt, nickel, magnesium, aluminum, boron, titanium, vanadium, chromium, iron, copper, zinc, molybdenum, tin, calcium, strontium and tungsten. v, w, x and y represent values within the ranges 0.9≤v≤1.1, 0≤w≤0.6, 3.7≤x≤4.1, and 0≤y≤0.1.

The composition of lithium varies depending on the state of charge and discharge, and the value of v represents the value in a fully discharged state.)

$$Li_zM7PO_4 \quad (G)$$

(In Formula (G), M7 represents at least one from the group consisting of cobalt, manganese, iron, nickel, magnesium, aluminum, boron, titanium, vanadium, niobium (Nb), copper, zinc, molybdenum, calcium, strontium, tungsten and zirconium. z represents a value within the range 0.9≤z≤1.1. The composition of lithium varies depending on the state of charge and discharge, and the value of z represents the value in a fully discharged state.)

As the lithium composite oxide containing Ni, a lithium composite oxide (NCM) containing lithium, nickel, cobalt, manganese, and oxygen, a lithium composite oxide (NCA)

containing lithium, nickel, cobalt, aluminum, and oxygen, and the like may be used. As the lithium composite oxide containing Ni, concretely, the oxides represented by the following Formula (H) or Formula (I) may be used.

$$Li_{v1}Ni_{w1}M1'_{x1}O_{z1} \qquad (H)$$

(In Formula, v1, w1, x1, and z meet $0<v1<2$, $w1+x1\leq1$, $0.2\leq w1\leq1$, $0\leq x1\leq0.7$, $0<z<3$, M1' is at least one or more from elements of transition metals such as cobalt, iron, manganese, copper, zinc, aluminum, chromium, vanadium, titanium, magnesium, and zirconium.)

$$Li_{v2}Ni_{w2}M2'_{x2}O_{z2} \qquad (I)$$

(In Formula, v2, w2, x2, and z2 meet $0<v2<2$, $w2+x2\leq1$, $0.65\leq w2\leq1$, $0\leq x2\leq0.35$, $0<z2<3$, M2' is at least one or more from elements of transition metals such as cobalt, iron, manganese, copper, zinc, aluminum, chromium, vanadium, titanium, magnesium, and zirconium.)

In addition to the foregoing, other examples of the positive electrode active material capable of occluding and releasing lithium also include inorganic compounds containing no lithium, such as $MnO_2$, $V_2O_5$, $V_6O_{13}$, NiS, and MoS.

The positive electrode active material capable of occluding and releasing lithium may be any other than those mentioned above. In addition, two or more of the positive electrode active materials exemplified above may be mixed in arbitrary combination.

A method for producing the positive electrode material described above will be described. First, a positive electrode active material is synthesized by a solid phase method, for example. It is to be noted that the method for synthesizing the positive electrode active material is not to be considered limited to the solid phase method, for example, a common method for synthesizing a positive electrode active material may be used, such as a precipitation method and a vapor phase method other than the solid phase method, and the positive electrode active material may be synthesized by, after preparing precursor particles, mixing and firing the precursor particles and a lithium compound. Specifically, for example, the positive electrode active material may be synthesized by, after obtaining precursor particles by a coprecipitation method or the like, mixing and firing the precursor particles and a lithium compound, or the positive electrode active material may be synthesized by, after obtaining precursor particles by a solid phase method or a sol-gel method, mixing and firing the precursor particles and a lithium compound.

Next, a solution is prepared by dissolving aluminum isopropoxide and lithium hydroxide (LiOH) in a solvent. As the solvent, any solvent may be adopted as long as the solvent is capable of dissolving aluminum isopropoxide and lithium hydroxide (LiOH), and for example, organic solvents can be used, e.g., alcohols such as ethanol, methanol, and 2-propanol, N-methyl-2-pyrrolidone (NMP), dimethylformamide, N,N-dimethylacetoamide, N, N-dimethylsulfoxide, and hexamethylphosphoramide.

Thereafter, the positive electrode active material is added to the prepared solution, and then stirred and dispersed, and thereafter, the solution is filtered and dried. Thus, as a positive electrode material, a mixture is obtained which includes: positive electrode active material particles with surfaces at least partially covered with $Li_xAl_2(OH)_{7-y}\cdot zH_2O$; and $Li_xAl_2(OH)_{7-y}\cdot zH_2O$ present without covering the surfaces of the positive electrode active material particles.

The positive electrode material obtained in the way described above may be subjected to classification or the like, thereby separating the positive electrode active material particles with surfaces at least partially covered with $Li_xAl_2(OH)_{7-y}\cdot zH_2O$ from the $Li_xAl_2(OH)_{7-y}\cdot zH_2O$ present without covering the surfaces of the positive electrode active material particles.

The positive electrode material according to the first embodiment includes a positive electrode active material and $Li_xAl_2(OH)_{7-y}\cdot zH_2O$ ($0.9<x<1.1$, $-0.1<y<0.1$, $0\leq z<2.1$). Thus, the thermal stability of the positive electrode material can be improved. This is because, conceivably, the $Li_xAl_2(OH)_{7-y}\cdot zH_2O$ has an endothermic property, thus making it possible for the $Li_xAl_2(OH)_{7-y}\cdot zH_2O$ to reduce the heat generated when the temperature of the positive electrode active material is increased. Therefore, in a case in which the positive electrode is prepared with the use of the positive electrode material according to the first embodiment, the thermal stability of the positive electrode can be improved. It is to be noted that Patent Document 1 fails to mention that $LiAlO_2$ itself as an additive material contributes to thermal stability.

In accordance with the invention mentioned in Patent Document 1, there is a possibility that Al derived from $LiAlO_2$ may diffuse even into the positive electrode active material particles depending on the firing conditions. Furthermore, in a case in which Al is made present as a solid solution near the surfaces of the positive electrode active material particles, there is a possibility of decreasing the discharge capacity together with the amount of Al. On the other hand, the positive electrode material according to the first embodiment is not intended to make Al present as a solid solution near the surfaces of the positive electrode active material particles in solid solution, and there is thus no possibility of diffusion or decrease in capacity due to the solid solution of Al as mentioned above.

The positive electrode material may contain $Li_xAl_2O_{4-y}\cdot zH_2O$ ($1.9<x<2.1$, $-0.1<y<0.1$, $0\leq z<2.1$) instead of $Li_xAl_2(OH)_{7-y}\cdot zH_2O$, or include $Li_xAl_2O_{4-y}\cdot zH_2O$ ($1.9<x<2.1$, $-0.1<y<0.1$, $0\leq z<2.1$) together with $Li_xAl_2(OH)_{7-y}\cdot zH_2O$. Also in this case, the thermal stability of the positive electrode material can be improved.

In the method for producing the positive electrode material according to the first embodiment, in a case in which a required amount of lithium hydroxide is present in advance as an impurity in the positive electrode active material, the positive electrode material may be prepared without newly adding lithium hydroxide. More specifically, the positive electrode material according to the first embodiment may be prepared only by adding aluminum isopropoxide.

The positive electrode material according to the first embodiment may be prepared by synthesizing $Li_xAl_2(OH)_{7-y}\cdot zH_2O$ in advance, and simply mixing this $Li_xAl_2(OH)_{7-y}\cdot zH_2O$ with the positive electrode active material or mixing the $Li_xAl_2(OH)_{7-y}\cdot zH_2O$ with the positive electrode active material by a mechanochemical method or the like. In this case, it is possible to synthesize $Li_xAl_2(OH)_{7-y}\cdot zH_2O$, for example, in the following way. First, aluminum isopropoxide and lithium hydroxide monohydrate are added to a solvent, and the mixture is stirred with a stirrer. Thereafter, the precipitate is filtered and dried to obtain $Li_xAl_2(OH)_{7-y}\cdot zH_2O$.

In the second embodiment, a secondary battery including a positive electrode including the above-described positive electrode material according to the first embodiment will be described.

A configuration example of the secondary battery according to the second embodiment of the present technology will be described below with reference to FIG. 1. This secondary battery is, for example, a so-called lithium ion secondary battery in which the capacity of a negative electrode is represented by a capacity component obtained by occlusion and release of lithium (Li) which is an electrode reactant. The secondary battery is what is referred to as a so-called cylindrical type, which has, inside a substantially hollow cylindrical battery can 11, a spirally wound electrode body 20 with a pair of band-shaped positive electrodes 21 and band-shaped negative electrode 22 stacked with a separator 23 interposed therebetween and spirally wound. The battery can 11 is made of iron (Fe) plated with nickel (Ni), which has one end closed and the other end opened. Inside the battery can 11, an electrolytic solution as a liquid electrolyte is injected, with which the positive electrode 21, the negative electrode 22, and the separator 23 are impregnated. In addition, a pair of insulating plates 12, 13 is each disposed perpendicularly to the winding circumferential surface so as to sandwich the spirally wound electrode body 20.

The open end of the battery can 11 has a battery cover 14, and a safety valve mechanism 15 and a thermosensitive resistive element (Positive Temperature Coefficient; PTC element) 16 provided inside the battery cover 14, which are attached by crimping via a sealing gasket 17. Thus, the inside of the battery can 11 is hermetically sealed. The battery cover 14 is made of, for example, the same material as the battery can 11. The safety valve mechanism 15 is electrically connected to the battery cover 14, and in a case in which the internal pressure of the battery reaches a pressure equal to or higher than a certain level due to an internal short circuit of the battery or heating from the outside, or the like, intended to invert the disk plate 15A, and electrically disconnect the battery cover 14 and the wound electrode body 20. The sealing gasket 17 is made of, for example, an insulating material, and the surface thereof is coated with asphalt.

For example, a center pin 24 is inserted in the center of the wound electrode body 20. A positive electrode lead 25 made of aluminum (Al) or the like is connected to the positive electrode 21 of the wound electrode body 20, and a negative electrode lead 26 made of nickel or the like is connected to the negative electrode 22. The positive electrode lead 25 is welded to the safety valve mechanism 15 to be electrically connected to the battery cover 14, and the negative electrode lead 26 is welded to the battery can 11 to be electrically connected thereto.

Figure 2:
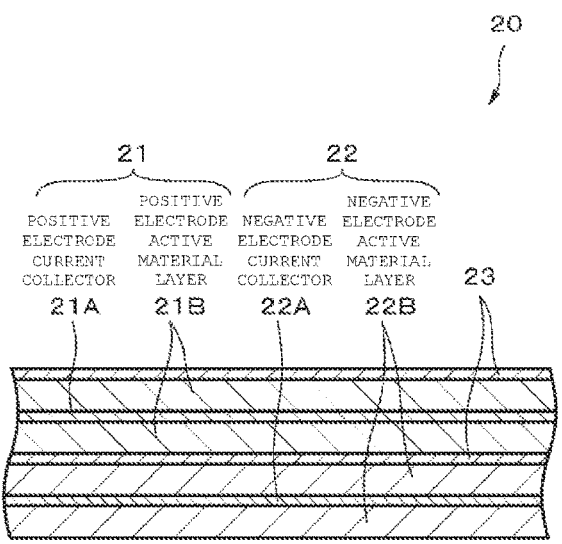
FIG. 2 is a cross-sectional view illustrating an enlarged part of the wound electrode body shown in FIG. 1.

The positive electrode 21, the negative electrode 22, the separator 23, and the electrolytic solution constituting the secondary battery will be sequentially described below with reference to FIG. 2.

The positive electrode 21 has, for example, a structure with a positive electrode active material layer 21B provided on both surfaces of a positive electrode current collector 21A. It is to be noted that, although not shown, the positive electrode active material layer 21B may be provided only on one surface of the positive electrode current collector 21A. The positive electrode current collector 21A is made from, for example, metal foil such as aluminum foil, nickel foil, or stainless steel foil. The positive electrode active material layer 21B includes the positive electrode material according to the first embodiment. The positive electrode active material layer 21B may further contain an additive, if necessary. For example, at least one of a conducting agent and a binder can be used as the additive.

In the positive electrode active material layer 21B, the $Li_xAl_2(OH)_{7-y}\cdot zH_2O$ at least partially covers the surfaces of the positive electrode active material particles. Specifically, the $Li_xAl_2(OH)_{7-y}\cdot zH_2O$ may partially cover the surfaces of the positive electrode active material particles, or may cover the entire surfaces of the positive electrode active material particles, but from the viewpoint of improving the thermal stability of the positive electrode 21, it is preferable to cover the entire surfaces of the positive electrode active material particles.

The positive electrode active material layer 21B may further include, in addition to $Li_xAl_2(OH)_{7-y}\cdot zH_2O$ covering at least partially the surfaces of the positive electrode active material particles, $Li_xAl_2(OH)_{7-y}\cdot zH_2O$, which does not cover the surfaces of the positive electrode active material particles, separately from the positive electrode active material particles. More specifically, the positive electrode active material layer 21B may include a mixture of: the positive electrode active material particles with surfaces covered with $Li_xAl_2(OH)_{7-y}\cdot zH_2O$; and the $Li_xAl_2(OH)_{7-y}\cdot zH_2O$ present without covering the surfaces of the positive electrode active material particles. In this case, the $Li_xAl_2(OH)_{7-y}\cdot zH_2O$ present without covering the surfaces of the positive electrode active material particles may be dispersed in the positive electrode active material layer 21B.

Alternatively, the positive electrode active material layer 21B may include, in place of $Li_xAl_2(OH)_{7-y}\cdot zH_2O$ covering at least partially the surfaces of the positive electrode active material particles, $Li_xAl_2(OH)_{7-y}\cdot zH_2O$, which does not cover the surfaces of the positive electrode active material particles, separately from the positive electrode active material particles. More specifically, the positive electrode active material layer 21B may include a mixture of: the positive electrode active material particles with surfaces covered with no $Li_xAl_2(OH)_{7-y}\cdot zH_2O$; and the $Li_xAl_2(OH)_{7-y}\cdot zH_2O$ present without covering the surfaces of the positive electrode active material particles. In this case, the $Li_xAl_2(OH)_{7-y}\cdot zH_2O$ present without covering the surfaces of the positive electrode active material particles may be dispersed in the positive electrode active material layer 21B.

For example, at least one selected from resin materials such as polyvinylidene fluoride (PVdF), polytetrafluoroethylene (PTFE), polyacrylonitrile (PAN), styrene butadiene rubber (SBR) and carboxymethyl cellulose (CMC), and copolymers mainly of the resin materials is used as the binder. In a case in which the positive electrode active material layer 21B includes the $Li_xAl_2(OH)_{7-y}\cdot zH_2O$ present without covering the surfaces of the positive electrode active material particles, separately from the positive electrode active material particles, the $Li_xAl_2(OH)_{7-y}\cdot zH_2O$ may be supported on a binder.

Examples of the conductive agent include carbon materials such as graphite, carbon fibers, carbon black, Ketjen black, or carbon nanotubes, for example, and one of these materials may be used alone, or two or more thereof may be used in mixture.

Besides the carbon materials, a metal material, a conductive polymer material, or the like may be used as long as the material has conductivity.

The negative electrode 22 has, for example, a structure with a negative electrode active material layer 22B provided on both surfaces of a negative electrode current collector 22A. It is to be noted that, although not shown, the negative electrode active material layer 22B may be provided only on one surface of the negative electrode current collector 22A. The negative electrode current collector 22A is made from, for example, metal foil such as copper foil, nickel foil, or stainless steel foil.

The negative electrode active material layer 22B includes one, or two or more negative electrode active materials capable of occluding and releasing lithium. The negative electrode active material layer 22B may further contain an additive such as a binder and a conducting agent, if necessary.

It should be understood that in this secondary battery, the electrochemical equivalent of the negative electrode 22 or the negative electrode active material is larger than the electrochemical equivalent of the positive electrode 21, and theoretically, lithium metal is preferably kept from being precipitated on the negative electrode 22 in the course of charging.

Examples of the negative electrode active material include, for example, carbon materials such as non-graphitizable carbon, graphitizable carbon, graphite, pyrolytic carbon, coke, glassy carbon, a fired body of organic polymer compound, carbon fibers, or activated carbon. Among the foregoing materials, examples of the coke include pitch coke, needle coke, and petroleum coke. The fired body of organic polymer compound refers to product carbonized by firing polymer materials such as phenolic resins or furan resins at appropriate temperatures, and some of the products are classified in non-graphitizable carbon or graphitizable carbon. These carbon materials are preferred because the crystal structures produced during charging/discharging undergo little change, thereby making it possible to achieve a high charge/discharge capacity, and making it possible to achieve favorable cycle characteristics. In particular, graphite is preferred because of its large electrochemical equivalent, which allows for the achievement of a high energy density. In addition, non-graphitizable carbon is preferred because excellent cycle characteristics are achieved. Furthermore, materials that are low in charge/discharge potential, specifically materials that are close in charging/discharging potential to lithium metal, are preferred because the materials can easily achieve increases in the energy density of the battery.

In addition, examples of another negative electrode active material capable of increasing the capacity also include a material containing at least one of a metal element and a metalloid element as a constituent element (for example, an alloy, a compound, or a mixture). This is because the use of such a material can achieve a high energy density. In particular, the use together with a carbon material is more preferred because a high energy density can be achieved, and because excellent cycle characteristics can be achieved. It is to be noted that, in the present technology, examples of the alloy includes, in addition to alloys composed of two or more metal elements, alloys containing one or more metal elements and one or more metalloid elements. In addition, the alloy may also contain a nonmetallic element. Examples of the compositional structure include a solid solution, a eutectic (eutectic mixture), an intermetallic compound, or a mixture of two or more thereof.

Examples of such a negative electrode active material include, for example, a metal element or a metalloid element capable of forming an alloy with lithium. Specifically, the examples include magnesium, boron, aluminum, titanium, gallium (Ga), indium (In), silicon (Si), germanium (Ge), tin, lead (Pb), bismuth (Bi), cadmium (Cd) silver (Ag), zinc, hafnium (Hf), zirconium (Zr), yttrium (Y), palladium (Pd) or platinum (Pt). These may be crystalline or amorphous.

As the negative electrode active material, a material containing, as a constituent element, a metal element or a metalloid element of Group 4B in the short periodic table is preferred, and more preferred is a material containing at least one of silicon and tin as a constituent element. This is because silicon and tin are high in ability to occlude and release lithium, and thus capable of achieving a high energy density. Examples of such a negative electrode active material include: a simple substance, an alloy, or a compound of silicon; a simple substance, an alloy, or a compound of tin; and a material that at least partially has a phase of one, or two or more thereof.

Examples of the alloy of silicon include, for example, an alloy containing, as a second constituent element other than silicon, at least one from the group consisting of tin, nickel, copper, iron, cobalt, manganese, zinc, indium, silver, titanium, germanium, bismuth, antimony (Sb) and chromium. Examples of the alloy of tin include, for example, an alloy containing, as a second constituent element other than tin, at least one from the group consisting of silicon, nickel, copper, iron, cobalt, manganese, zinc, indium, silver, titanium, germanium, bismuth, antimony and chromium.

Examples of the compound of tin or the compound of silicon include, for example, a compound containing oxygen or carbon, and may contain, in addition to tin or silicon, the second constituent element described above.

Above all, as a Sn-based negative electrode active material, a SnCoC-containing material is preferred which contains cobalt, tin, and carbon as constituent elements, where the content of carbon is 9.9% by mass or more and 29.7% by mass or less, and the proportion of cobalt to the total of tin and cobalt is 30% by mass or more and 70% by mass or less. This is because in such a composition range, a high energy density can be achieved, and excellent cycle characteristics can be achieved.

This SnCoC-containing material may further contain other constituent elements, if necessary. The other constituent elements preferably include, for example, silicon, iron, nickel, chromium, indium, niobium, germanium, titanium, molybdenum, aluminum, phosphorus (P), gallium or bismuth, and the material may contain two or more thereof. This is because the capacity or cycle characteristics can be further improved.

It should be understood that this SnCoC-containing material has a phase containing tin, cobalt, and carbon, and this phase preferably has a low crystallinity or amorphous structure. In addition, in this SnCoC-containing material, the carbon as a constituent element is preferably at least partially bonded to a metal element or a metalloid element which is another constituent element. This is because, while deterioration of cycle characteristics is believed to be caused by aggregation or crystallization of tin or the like, the carbon is bonded to another element, thereby making it possible to suppress such aggregation or crystallization.

Examples of a measurement method for examining the bonding state of the element include, for example, an X-ray photoelectron spectroscopy (XPS). In accordance with XPS, the peak of the 1s orbit (C1s) of carbon appears at 284.5 eV, in the case of graphite, in a device calibrated in terms of energy so that the peak of the 4f orbital (Au4f) of a gold atom is obtained at 84.0 eV. In addition, in the case of surface contaminated carbon, the peak appears at 284.8 eV. In contrast, when the carbon element increases in charge density, the peak of C1s appears in a lower range than 284.5 eV, for example, when carbon is bonded to a metal element or a metalloid element. More specifically, when the peak of a synthetic wave of C1s obtained for the SnCoC-containing material appears in a lower range than 284.5 eV, the carbon included in the SnCoC-containing material is at least partially bonded to a metal element or a metalloid element as another constituent element.

It should be understood that in the XPS measurement, for example, the peak of C1s is used for the correction of the energy axis of the spectrum. Typically, surface contaminated carbon is present on the surface, the peak of C1s of surface contaminated carbon is determined to be 284.8 eV, which is regarded as an energy reference. In the XPS measurement, the waveform of the peak of C1s is obtained in a form including the peak of the surface contaminated carbon and the peak of the carbon in the SnCoC-containing material, and thus, the analysis with the use of, for example, commercially available software separates the peak of the surface contaminated carbon from the peak of the carbon in the SnCoC-containing material. In the analysis of the waveform, the position of the main peak present on the lowest binding energy side is determined to be an energy reference (284.8 eV).

Other negative electrode active materials also include, for example, a metal oxide or a polymer compound capable of occluding and releasing lithium. Examples of the metal oxide include, for example, a lithium titanium oxide containing titanium and lithium such as lithium titanate ($Li_4Ti_5O_{12}$), an iron oxide, a ruthenium oxide, or a molybdenum oxide. Examples of the polymer compound include, for example, polyacetylene, polyaniline, or polypyrrole.

As the binder, for example, at least one is used which is selected from resin materials such as polyvinylidene fluoride, polytetrafluoroethylene, polyacrylonitrile, styrene butadiene rubber, and carboxymethyl cellulose, and copolymers mainly composed of the resin materials, and the like. As the conducting agent, the same carbon material as the positive electrode active material layer 21B, or the like can be used.

The separator 23 is intended to separate the positive electrode 21 and the negative electrode 22, thereby allowing passage of lithium ions while preventing short circuits due to the current caused by contact between the both electrodes. The separator 23 is composed of, for example, a porous membrane made from a resin such as polytetrafluoroethylene, polypropylene, or polyethylene, and may be adapted to have a structure obtained by laminating two or more of such porous membranes. Above all, a porous membrane made from polyolefin is preferred because the membrane has an excellent short circuit-prevention effect, and can make an improvement in battery safety by a shutdown effect. In particular, polyethylene is preferred as a material constituting the separator 23, because polyethylene can achieve the shutdown effect within a range of 100° C. or higher and 160° C. or lower, and also has excellent electrochemical stability. Besides, a material can be used which is obtained by copolymerizing or blending a chemically stable resin with polyethylene or polypropylene. Alternatively, the porous membrane may have a structure of three or more layers, where a polypropylene layer, a polyethylene layer, and a polypropylene layer are sequentially laminated.

The separator 23 may be configured to include a base material and a surface layer provided on one or both sides of the base material. The surface layer includes inorganic particles that have electrical insulation properties, and a resin material that binds the inorganic particles to the surface of the base material and binds the inorganic particles to each other. This resin material may be, for example, fibrillated to have a three-dimensional network structure with fibrils continuously interconnected. The inorganic particles are supported on the resin material which has the three-dimensional network structure, thereby making it possible to maintain the dispersed state without connecting to each other. Alternatively, the resin material may bind the surface of the base material or bind the inorganic particles to each other without being fibrillated. In this case, a higher binding ability can be achieved. The surface layer is provided on one or both surfaces of the base material as described above, thereby making it possible to impart oxidation resistance, heat resistance, and mechanical strength to the base material.

The base material is a porous layer that has porosity. More specifically, the base material is a porous membrane composed of an insulating film which has high ion permeability and predetermined mechanical strength, and the electrolytic solution is held in the pores of the base material. The base material preferably has predetermined mechanical strength as a main part of the separator, but also requires the characteristics of high resistance to the electrolytic solution, low reactivity, and difficulty with expansion.

It is preferable to use, as the resin material constituting the base material, for example, a polyolefin resin such as polypropylene or polyethylene, an acrylic resin, a styrene resin, a polyester resin, a nylon resin, or the like. In particular, polyethylene such as low-density polyethylene, high-density polyethylene, or linear polyethylene, or the low molecular weight wax thereof, or a polyolefin resin such as polypropylene is suitably used because of its appropriate melting temperature and availability. Alternatively, a laminated structure of two or more of the porous membranes, or a porous membrane formed by melting and kneading two or more of the resin materials may be adopted. The inclusion of a porous membrane made of a polyolefin resin has excellent separability between the positive electrode 21 and the negative electrode 22, and can further reduce the reduced internal short circuit.

As the base material, a nonwoven fabric may be used. Aramid fibers, glass fibers, polyolefin fibers, polyethylene terephthalate (PET) fibers, nylon fibers, or the like can be used as fibers constituting the nonwoven fabric. Alternatively, two or more of the fibers may be mixed as the nonwoven fabric.

The inorganic particles contain at least one of a metal oxide, a metal nitride, a metal carbide, a metal sulfide, and the like. Aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide silica, $SiO_2$), yttrium oxide (yttria, $Y_2O_3$), or the like can be suitably used as the metal oxide.

Silicon nitride ($Si_3N_4$), aluminum nitride (AlN), boron nitride (BN), titanium nitride (TiN), or the like can be suitably used as the metal nitride. Silicon carbide (SiC), boron carbide (B4C), or the like can be suitably used as the metal carbide. Barium sulfate ($BaSO_4$) or the like can be suitably used as the metal sulfide. Further, minerals may be used, e.g., porous aluminosilicate such as zeolite ($M_{2/n}$O.$Al_2O_3$.x$SiO_2$. y$H_2O$, M is a metal element, x≥2, y≥0), layered silicate, barium titanate ($BaTiO_3$), or strontium titanate ($SrTiO_3$).

Among the minerals, it is preferable to use alumina, titania (particularly, titania that has a rutile-type structure), silica, or magnesia, and it is more preferable to use alumina. The inorganic particles have oxidation resistance and heat resistance, and the surface layer at the side surface opposed to the positive electrode containing the inorganic particles also has strong resistance to an oxidizing environment near the positive electrode at the time of charging. The shapes of the inorganic particles are not particularly limited, and any of spherical, plate-like, fibrous, cubic, and random shapes and the like can be used.

Examples of the resin material constituting the surface layer include fluorine-containing resins such as polyvinylidene fluoride and polytetrafluoroethylene, fluorine-containing rubbers such as vinylidene fluoride-tetrafluoroethylene copolymers and ethylene-tetrafluoroethylene copolymers, styrene-butadiene copolymers or hydrogenated products thereof, acrylonitrile-butadiene copolymers or hydrogenated products thereof, acrylonitrile-butadiene-styrene copolymers or hydrogenated product thereof, methacrylic acid ester-acrylic acid ester copolymers, styrene-acrylic acid ester copolymers, acrylonitrile-acrylic acid ester copolymers, rubbers such as ethylene propylene rubbers, polyvinyl alcohol, and polyvinyl acetate, cellulose derivatives such as ethyl cellulose, methyl cellulose, hydroxyethyl cellulose, and carboxymethyl cellulose, polyphenylene ether, polysulfone, polyethersulfone, polyphenylene sulfide, polyether imide, polyimide, polyamides such as wholly aromatic polyamide (aramid), resins which have high heat resistance such that at least one of a melting point and a glass transition temperature is 180° C. or higher, such as polyamide imide, polyacrylonitrile, polyvinyl alcohol, polyether, acrylic acid resins, or polyester. These resin materials may be used alone, or two or more thereof may be used in mixture.

Among the materials, fluorine-based resins such as polyvinylidene fluoride are preferable from the viewpoint of oxidation resistance and flexibility, and from the viewpoint of heat resistance, aramid or polyamideimide is preferably included.

The inorganic particles preferably fall within the range of 1 nm to 10 μm in particle size. If the particle size is smaller than 1 nm, the inorganic substance is difficult to obtain, and even if the substance is available, the substance is not suitable in terms of cost. On the other hand, if the particle size is larger than 10 μm, the distance between the electrodes is increased, thereby achieving an insufficient amount of active material in a limited space, and thus decreasing the battery capacity.

As a method for forming the surface layer, a method can be used in which a slurry composed of the matrix resin, a solvent, and the inorganic substance is applied onto the base material (porous membrane), passed through a poor solvent of the matrix resin and a good solvent bath of the solvent to cause phase separation, and then dried.

It should be understood that the porous film as a base material may contain therein the above-described inorganic particles. Further, the surface layer may be, without including any inorganic particle, composed only of a resin material.

The separator 23 is impregnated with an electrolytic solution which is a liquid electrolyte. The electrolytic solution includes a solvent and an electrolyte salt dissolved in the solvent. In order to improve the battery characteristics, the electrolytic solution may contain known additives.

As the solvent, a cyclic carbonate such as ethylene carbonate or propylene carbonate can be used, and it is preferable to use one of ethylene carbonate and propylene carbonate, particularly, use the both in mixture. This is because cycle characteristics can be improved.

As the solvent, and in addition to the foregoing cyclic carbonate esters, it is preferable to use, in mixture, a chain carbonate such as diethyl carbonate, dimethyl carbonate, ethyl methyl carbonate, or methyl propyl carbonate. This is because high ionic conductivity can be achieved.

The solvent preferably further contains 2,4-difluoroanisole or vinylene carbonate. This is because 2,4-difluoroanisole can improve the discharge capacity, whereas vinylene carbonate can improve cycle characteristics. Therefore, it is preferable to use the foregoing compounds in mixture, because the discharge capacity and cycle characteristics can be improved.

Besides the foregoing, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide, or trimethyl phosphate.

It should be understood that compounds in which at least some hydrogen of these non-aqueous solvents is substituted with fluorine may be preferred, because the compounds can sometimes improve the reversibility of the electrode reactions depending on the types of the electrodes to be combined.

Examples of the electrolyte salt include, for example, a lithium salt, and one type of electrolyte salt may be used alone, or two or more types of electrolyte salts may be used in mixture. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxolato-O,O'] lithium borate, lithium bis(oxalate)borate, or LiBr. Above all, $LiPF_6$ is preferred, because $LiPF_6$ can achieve high ionic conductivity and improve cycle characteristics.

In the secondary battery according to the second embodiment, the open circuit voltage (that is, the battery voltage) in the fully charged condition per pair of the positive electrode 21 and the negative electrode 22 is 4.2 V or lower, but the battery may be designed such that the voltage is preferably 4.25 V or higher, more preferably 4.3 V, even more preferably 4.4 V or higher. Increasing the battery voltage can achieve a high energy density. The upper limit of the open circuit voltage in the fully charged condition per pair of the positive electrode 21 and the negative electrode 22 is preferably 6.00 V or lower, more preferably 4.60 V or lower, even more preferably 4.50 V or lower.

In a case in which the positive electrode active material is a lithium composite oxide represented by Formula (E), the effect of improving the thermal stability of the positive electrode active material layer 21B is significantly produced in a secondary battery designed to have the open circuit voltage of higher than 4.15 V or 4.20 V or higher. In a case in which the positive electrode active material is a lithium composite oxide represented by Formula (F), the effect of improving the thermal stability of the positive electrode active material layer 21B is significantly produced in a secondary battery designed to have the open circuit voltage of higher than 4.20 V or 4.25 V or higher. In a case in which the positive electrode active material is a lithium composite oxide represented by Formula (H), the effect of improving the thermal stability of the positive electrode active material layer 21B is significantly produced in a secondary battery designed to have the open circuit voltage of higher than 4.25 V or 4.30 V or higher. In a case in which the positive electrode active material is a lithium composite oxide represented by Formula (I), the effect of improving the thermal stability of the positive electrode active material layer 21B is significantly produced in a secondary battery designed to have the open circuit voltage of higher than 4.10 V or 4.15 V or higher.

In the non-aqueous electrolyte secondary battery configured as described above, on charging, for example, lithium ions are released from the positive electrode active material layer 21B, and occluded by the negative electrode active material layer 22B through the electrolytic solution. Further, on discharging, for example, lithium ions are released from the negative electrode active material layer 22B, and occluded by the positive electrode active material layer 21B through the electrolytic solution.

Next, an example of a method for manufacturing the secondary battery according to the second embodiment of the present technology will be described.

First, for example, a positive electrode combination is prepared by mixing the positive electrode material according to the first embodiment, a conducting agent, and a binder, and this positive electrode combination is dispersed in a solvent such as N-methyl-2-pyrrolidone (NMP), thereby preparing a paste-like positive electrode combination slurry. Next, the positive electrode combination slurry is applied to the positive electrode current collector 21A, and subjected to solvent drying, and to compression molding by a roll press machine or the like to form the positive electrode active material layer 21B, thereby forming the positive electrode 21.

In addition, for example, a negative electrode combination is prepared by mixing a negative electrode active material and a binder, and this negative electrode combination is dispersed in a solvent such as N-methyl-2-pyrrolidone, thereby preparing a paste-like negative electrode combination slurry. Next, the negative electrode combination slurry is applied to the negative electrode current collector 22A, and subjected to solvent drying, and to compression molding by a roll press machine or the like to form the negative electrode active material layer 22B, thereby preparing the negative electrode 22.

Next, the positive electrode lead 25 is attached by welding or the like to the positive electrode current collector 21A, and the negative electrode lead 26 is attached by welding or the like to the negative electrode current collector 22A.

Next, the positive electrode 21 and the negative electrode 22 are wound with the separator 23 interposed therebetween. Next, the head of the positive electrode lead 25 is welded to the safety valve mechanism 15, and the head of the negative electrode lead 26 is welded to the battery can 11, and the wound positive electrode 21 and negative electrode 22 are sandwiched between the pair of insulating plates 12 and 13, and housed in the battery can 11. Next, after the positive electrode 21 and the negative electrode 22 are housed in the battery can 11, an electrolytic solution is injected into the battery can 11 to impregnate the separator 23. Next, the battery cover 14, the safety valve mechanism 15, and the thermosensitive resistive element 16 are fixed to the opening end of the battery can 11 by crimping via the sealing gasket 17. Thus, the secondary battery shown in FIG. 2 is obtained.

In the battery according to the second embodiment, the positive electrode active material layer 21B includes the positive electrode material according to the first embodiment, thus allowing the thermal stability of the positive electrode active material layer 21B to be improved. Therefore, the thermal stability of the battery can be improved.

In a case in which the positive electrode active material layer 21B includes the $Li_xAl_2(OH)_{7-y} \cdot zH_2O$ present without covering the surfaces of the positive electrode active material particles, separately from the positive electrode active material particles, the $Li_xAl_2(OH)_{7-y} \cdot zH_2O$ may have a concentration distribution in the positive electrode active material layer 21B. For example, the concentration of $Li_xAl_2(OH)_{7-y} \cdot zH_2O$ at the surface of the positive electrode active material layer 21B may be higher than the concentration of $Li_xAl_2(OH)_{7-y} \cdot zH_2O$ in the positive electrode active material layer 21B.

The positive electrode active material layer 21B may include the positive electrode material according to Modification Example 1 of the first embodiment. Also in this case, the thermal stability of the positive electrode active material layer 21B can be improved.

In the process of preparing the positive electrode 21, a positive electrode combination may be prepared by mixing a positive electrode active material, $Li_xAl_2(OH)_{7-y} \cdot zH_2O$ synthesized in advance, a conductive agent, and a binder.

Figure 3:
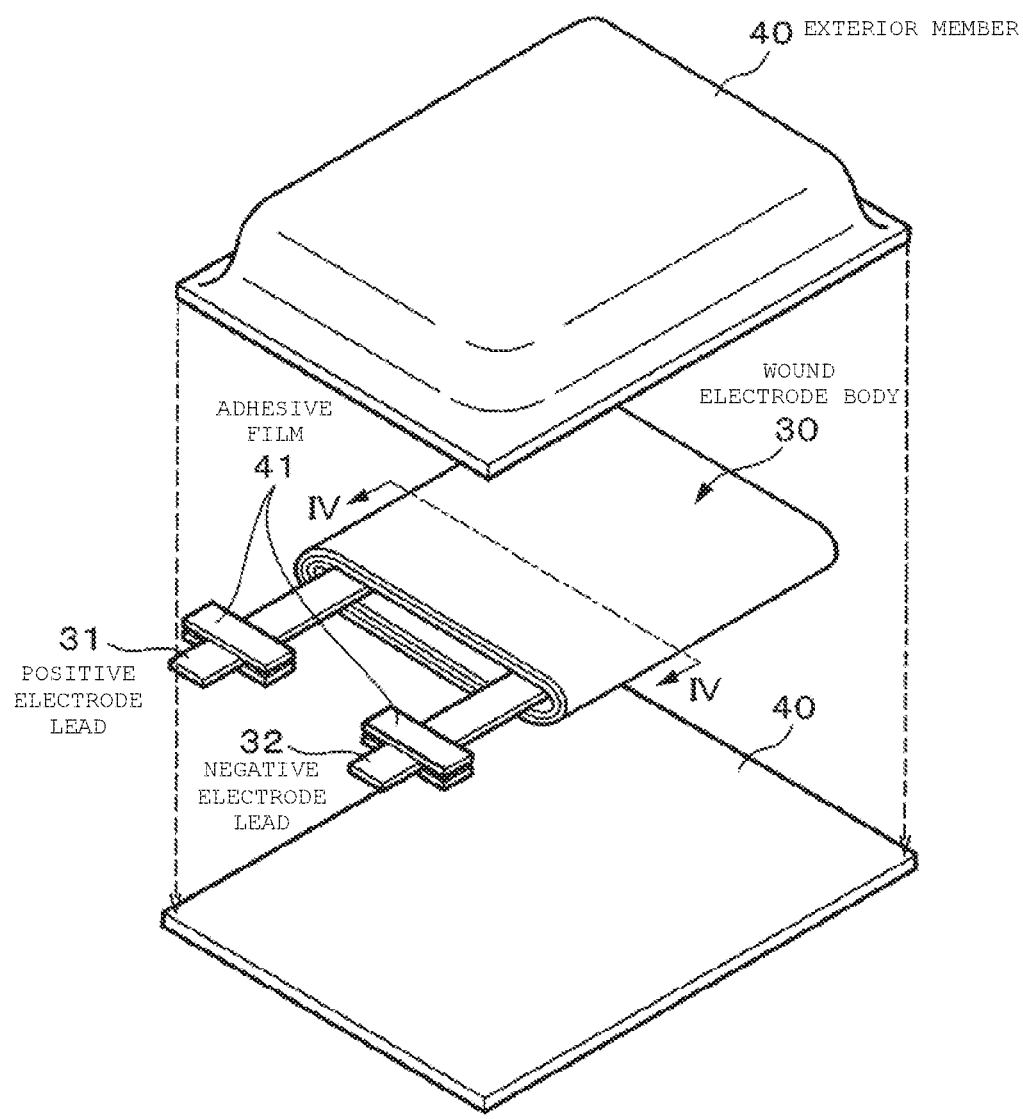
FIG. 3 is an exploded perspective view illustrating an example of the configuration of a non-aqueous electrolyte secondary battery according to a third embodiment of the present technology.

FIG. 3 is an exploded perspective view illustrating a configuration example of a secondary battery according to a third embodiment of the present technology. This secondary battery is what is referred to as a flattened type or a rectangular type, where a wound electrode body 30 with a positive electrode lead 31 and a negative electrode lead 32 attached thereto is housed in a film-like exterior member 40, thereby allowing for the reduction in size, the reduction in weight, and the reduction in thickness.

The positive electrode lead 31 and the negative electrode lead 32 are each led out from the inside of the exterior member 40 toward the outside, for example, in the same direction. Each of the positive electrode lead 31 and the negative electrode lead 32 is made from, for example, a metal material such as aluminum, copper, nickel, or stainless steel, and adapted to have the form of a thin plate or mesh.

The exterior member 40 is composed of, for example, a rectangular aluminum laminate film with a nylon film, an aluminum foil, and a polyethylene film bonded to each other in this order. The exterior member 40 is provided, for example, such that the polyethylene film side and the wound electrode body 30 are opposed to each other, and respective outer edges thereof are attached firmly to each other by fusion bonding or with an adhesive. Between the exterior member 40 and the positive electrode lead 31 and the negative electrode lead 32, an adhesive film 41 for preventing the intrusion of outside air is inserted. The adhesive film 41 is made from a material that has adhesiveness to the positive electrode lead 31 and the negative electrode lead 32, for example, a polyolefin resin such as polyethylene, polypropylene, modified polyethylene, or modified polypropylene.

It should be understood that the exterior member 40 may be composed of a laminate film that has another structure, a polymer film such as polypropylene, or a metal film, instead of the above-described aluminum laminate film. Alternatively, a laminate film may be used which has a polymer film laminated on one or both sides of an aluminum film as a core material.

Figure 4:
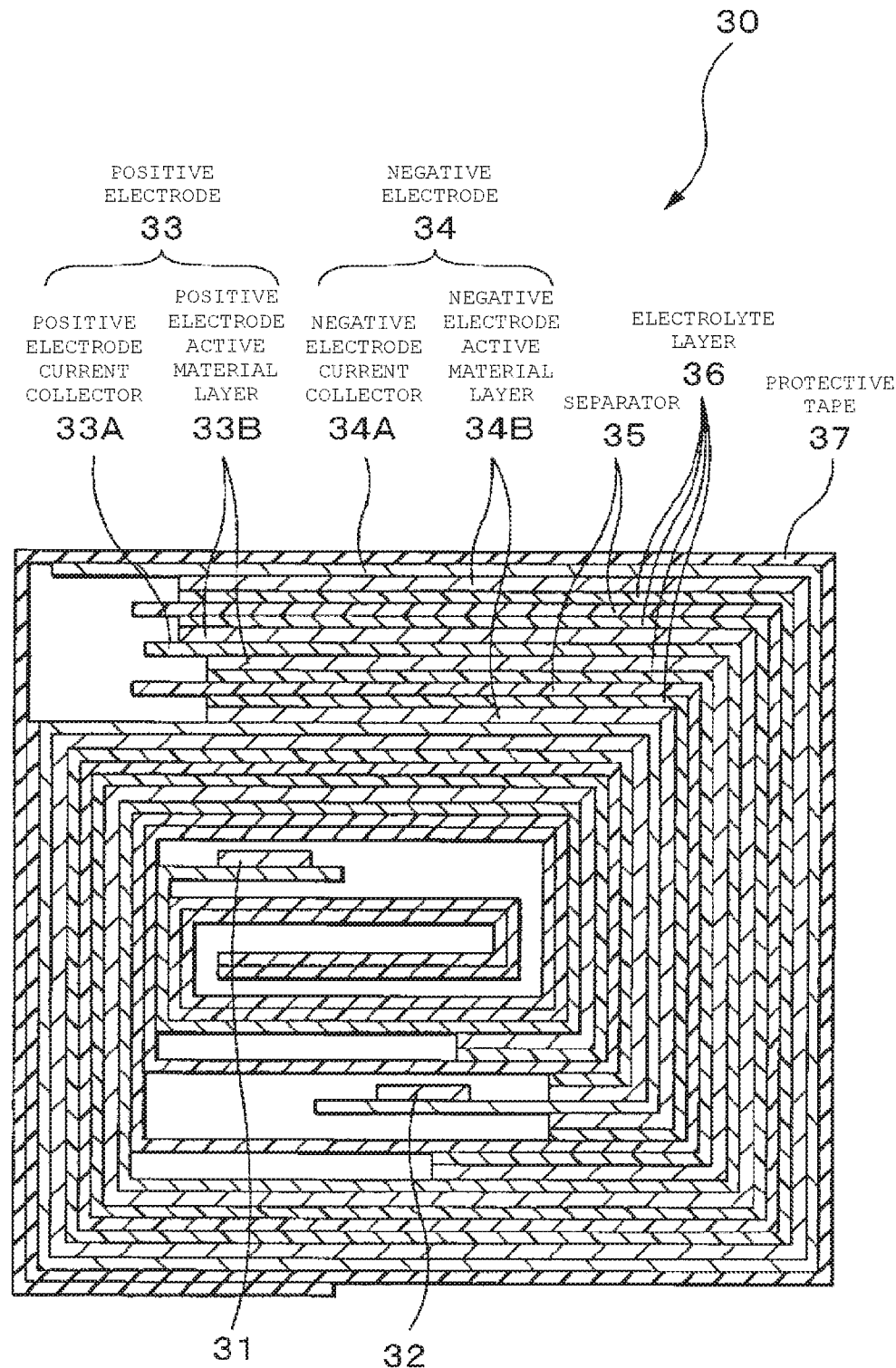
FIG. 4 is a cross-sectional view of the wound electrode body taken along the line IV-IV of FIG. 3.

FIG. 4 is a cross-sectional view of the wound electrode body 30 shown in FIG. 3, taken along the line IV-IV thereof. The wound electrode body 30 is obtained by stacking a positive electrode 33 and a negative electrode 34 with a separator 35 and an electrolyte layer 36 interposed therebetween, and is wound, and the outermost circumference is protected by a protective tape 37.

The positive electrode 33 has a structure with a positive electrode active material layer 33B provided on one or both surfaces of a positive electrode current collector 33A. The negative electrode 34 has a structure with a negative electrode active material layer 34B provided on one or both surfaces of the negative electrode current collector 34A, which is disposed so that the negative electrode active material layer 34B and the positive electrode active material layer 33B are opposed to each other. The positive electrode current collector 33A, the positive electrode active material layer 33B, the negative electrode current collector 34A, the negative electrode active material layer 34B, and the separator 35 are configured respectively in the same manner as the positive electrode current collector 21A, the positive electrode active material layer 21B, the negative electrode current collector 22A, the negative electrode active material layer 22B, and the separator 23 according to the second embodiment.

The electrolyte layer 36 includes an electrolytic solution, and a polymer compound to serve as a holding body for holding the electrolytic solution, and has a so-called gel-like form. The gel-like electrolyte layer 36 is preferred, because of being capable of achieving a high ionic conductivity, and preventing liquid leakage from the battery. The electrolytic solution is the electrolytic solution according to the first embodiment. Examples of the polymer compound include, for example, polyacrylonitrile, polyvinylidene fluoride, a copolymer of vinylidene fluoride and hexafluoropropylene, polytetrafluoroethylene, polyhexafluoropropylene, a polyethylene oxide, a polypropylene oxide, polyphosphazene, polysiloxane, polyvinyl acetate, polyvinyl alcohol, polymethyl methacrylate, a polyacrylic acid, a polymethacrylic acid, a styrene-butadiene rubber, a nitrile-butadiene rubber, polystyrene, or polycarbonate. In particular, from the viewpoint of electrochemical stability, polyacrylonitrile, polyvinylidene fluoride, polyhexafluoropropylene, or polyethylene oxide is preferred.

It should be understood that the gel-like electrolyte layer 36 may include therein the same inorganic substance as the inorganic substance described in the explanation of the resin layer for the separator 23 in the second embodiment. This is because the heat resistance can be further improved. Further, instead of the electrolyte layer 36, an electrolytic solution may be used.

Next, an example of a method for manufacturing the secondary battery according to the third embodiment of the present technology will be described.

First, a precursor solution including a solvent, an electrolyte salt, a polymer compound, and a mixed solvent is applied to each of the positive electrode 33 and the negative electrode 34, and the mixed solvent is volatilized to form the electrolyte layer 36. Next, the positive electrode lead 31 is attached by welding to an end of the positive electrode current collector 33A, and the negative electrode lead 32 is attached by welding to an end of the negative electrode current collector 34A. Next, the positive electrode 33 and the negative electrode 34 with the electrolyte layer 36 formed are stacked with the separator 35 interposed therebetween, thereby providing a stacked body, thereafter, the stacked body is wound in the longitudinal direction, and the protective tape 37 is bonded to the outermost circumference, thereby forming the wound electrode body 30. Finally, for example, the wound electrode body 30 is sandwiched between the exterior members 40, and the outer edges of the exterior members 40 are brought into close contact with each other for sealing by heat sealing or the like. In that regard, the adhesive film 41 is inserted between the positive electrode lead 31 and the negative electrode lead 32 and the exterior members 40. Thus, the secondary battery shown in FIG. 4 and FIG. 4 is obtained.

Alternatively, this secondary battery may be prepared in the following manner. First, the positive electrode 33 and the negative electrode 34 are prepared as described above, and the positive electrode lead 31 and the negative electrode lead 32 are attached to the positive electrode 33 and the negative electrode 34. Next, the positive electrode 33 and the negative electrode 34 are stacked with the separator 35 interposed therebetween, and then wound, and the protective tape 37 is bonded to the outermost circumference, thereby forming a wound body. Next, the wound body is sandwiched between the exterior members 40, and housed in the exterior members 40 by heat-sealing the outer circumferential edge excluding one side into a bag shape.

Next, a composition for an electrolyte, which includes a solvent, an electrolyte salt, a monomer that is a raw material for the polymer compound, a polymerization initiator, and if necessary, other materials such as a polymerization inhibitor, is prepared, and injected into the exterior members 40.

Next, after injecting the composition for an electrolyte into the exterior members 40, the opening of the exterior members 40 is heat-sealed in a vacuum atmosphere. Next, heat is applied to polymerize the monomer and then provide a polymer compound, thereby forming the gel-like electrolyte layer 36. Thus, the secondary battery shown in FIG. 4 is obtained.

In Application Example 1, a battery pack and an electronic device that include a battery according to a first embodiment or a modification example thereof will be described.

Figure 5:
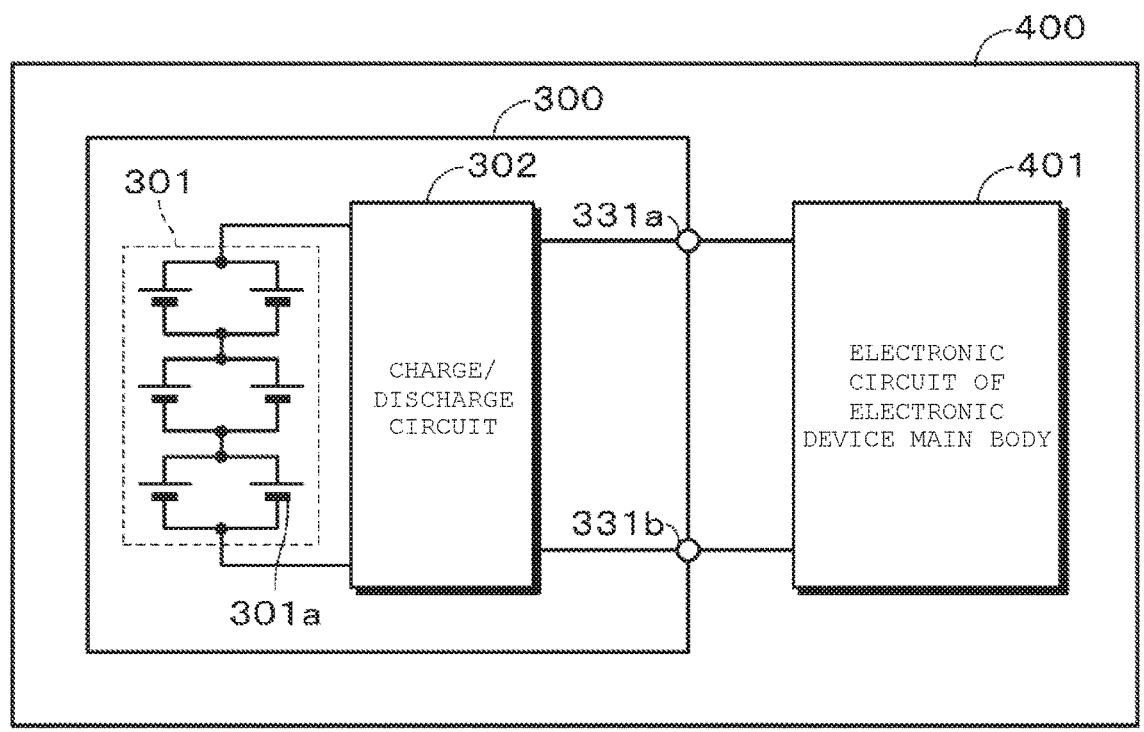
FIG. 5 is a block diagram illustrating an example of the configuration of an electronic device as an application example according to an embodiment of the present technology.

A configuration example of a battery pack 300 and an electronic device 400 as an application example will be described below with reference to FIG. 5. The electronic device 400 includes an electronic circuit 401 of an electronic device main body, and the battery pack 300. The battery pack 300 is electrically connected to the electronic circuit 401 via a positive electrode terminal 331a and a negative electrode terminal 331b. The electronic device 400 has, for example, a configuration that allows the user to attach/detach the battery pack 300. It is to be noted that the configuration of the electronic device 400 is not limited thereto, and the battery pack 300 may be configured to be built in the electronic device 400 so that the user is not allowed to remove the battery pack 300 from the electronic device 400.

In the case of charging the battery pack 300, the positive electrode terminal 331a and negative electrode terminal 331b of the battery pack 300 are respectively connected to a positive electrode terminal and a negative electrode terminal of a charger (not shown). On the other hand, in the case of discharging the battery pack 300 (in the case of using the electronic device 400), the positive electrode terminal 331a and negative electrode terminal 331b of the battery pack 300 are respectively connected to a positive electrode terminal and a negative electrode terminal of the electronic circuit 401.

Examples of the electronic device 400 include, but not limited to, notebook personal computers, tablet computers, mobile phones (for example, smartphones), personal digital assistants (Personal Digital Assistants: PDA), display devices (LCD, EL displays, electronic papers, etc.), imaging devices (for example, digital still cameras, digital video cameras, etc.), audio instruments (for example, portable audio players), game machines, cordless phone handsets, electronic books, electronic dictionaries, radios, headphones, navigation systems, memory cards, pacemakers, hearing aids, electric tools, electric shavers, refrigerators, air conditioners, television receivers, stereos, water heaters, microwave ovens, dishwashers, washing machines, driers, lighting devices, toys, medical devices, robots, road conditioners, and traffic lights.

The electronic circuit 401 includes, for example, a CPU, a peripheral logic unit, an interface unit, a storage unit, and the like, and controls the overall electronic device 400.

The battery pack 300 includes an assembled battery 301 and a charge/discharge circuit 302. The assembled battery 301 is configured to have a plurality of secondary batteries 301a connected in series and/or in parallel. The plurality of secondary batteries 301a are connected so as to arrange, for example, n batteries in parallel and m batteries in serial (n and m are positive integers). It is to be noted that FIG. 5 shows therein an example where six secondary batteries 301a are connected so as to arrange two batteries in parallel and three batteries in series (2P3S). The battery according to an embodiment or a modification example thereof is used as the secondary battery 301a.

The case where the battery pack 300 includes the assembled battery 301 composed of the plurality of secondary batteries 301a is described herein, but a configuration may be adopted where the battery pack 300 includes a single secondary battery 301a in place of the assembled battery 301.

The charge/discharge circuit 302 is a control unit (controller) that controls charging/discharging the assembled battery 301. The controller may include a processor. Specifically, in the case of charging, the charge/discharge circuit 302 controls charging the assembled battery 301. On the other hand, in the case of discharging (that is, in the case of using the electronic device 400), the charge/discharge circuit 302 controls discharging the electronic device 400.

Figure 6:
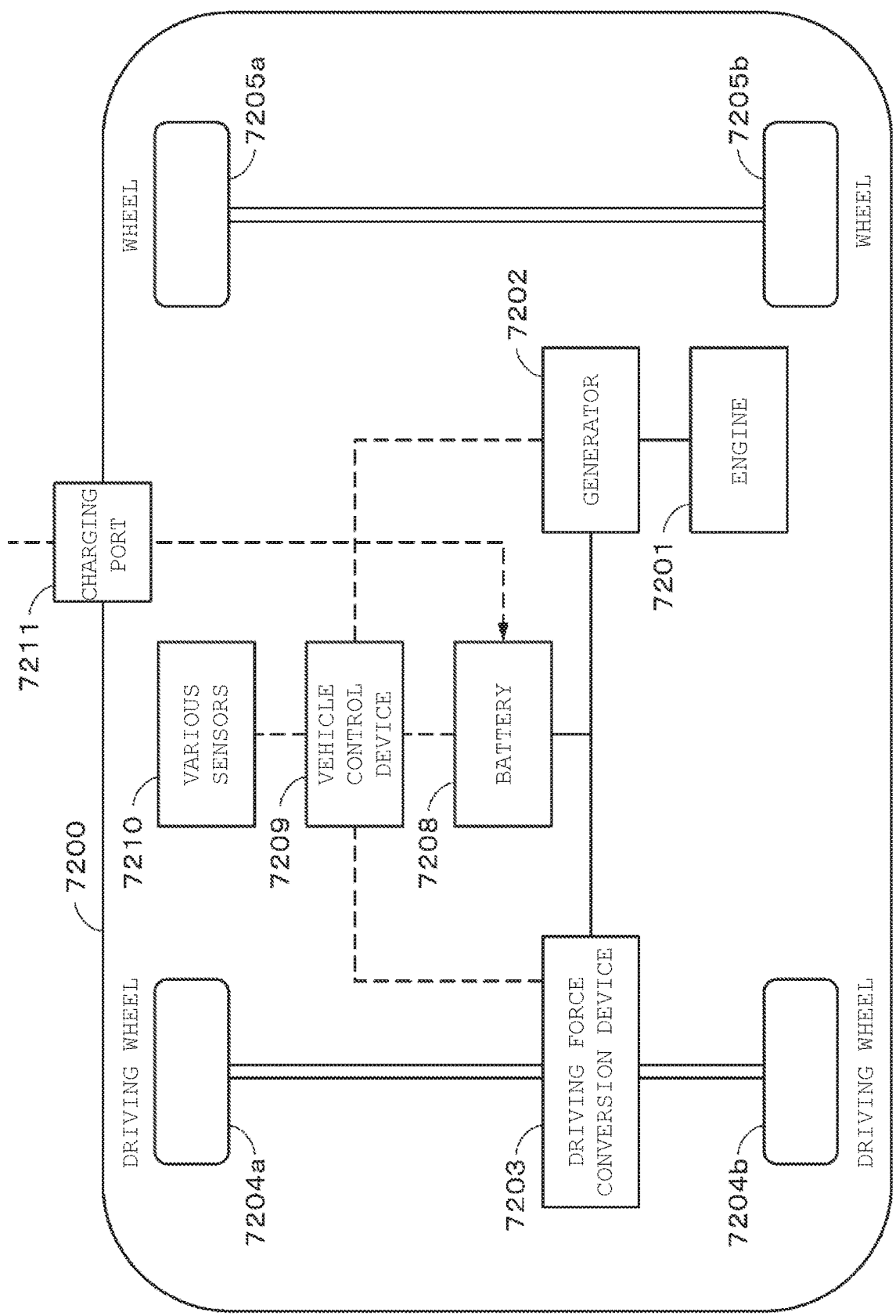
FIG. 6 is a schematic diagram illustrating an example of the configuration of an electric storage system in a vehicle as an application example according to an embodiment of the present technology.

An example of applying the present disclosure to an electric storage system for a vehicle will be described with reference to FIG. 6. FIG. 6 schematically illustrates an example of the configuration of a hybrid vehicle that adopts a series hybrid system to which the present disclosure is applied. The series hybrid system is intended for a vehicle that runs on an electric power-driving force conversion device, with the use of electric power generated by a generator driven by an engine, or the electric power stored once in the battery.

The hybrid vehicle 7200 carries an engine 7201, a generator 7202, the electric power-driving force conversion device 7203, a driving wheel 7204a, a driving wheel 7204b, a wheel 7205a, a wheel 7205b, a battery 7208, a vehicle control device 7209, various sensors 7210, and a charging port 7211. The above-described power storage device according to the present disclosure is applied to the battery 7208.

The hybrid vehicle 7200 travels with the electric power-driving force conversion device 7203 (converter) as a power source. An example of the electric power-driving force conversion device 7203 is a motor. The electric power-driving force conversion device 7203 is operated by the electric power of the battery 7208, and the torque of the electric power-driving force conversion device 7203 is transmitted to the driving wheels 7204a and 7204b. It is to be noted that the electric power-driving force conversion device 7203 can be applied to both an alternate-current motor and a direct-current motor by using direct current-alternate current (DC-AC) or reverse conversion (AC-DC conversion) in a required location. The various sensors 7210 control the engine rotation speed via the vehicle control device 7209 (controller), and control the position (throttle position) of a throttle valve, not shown. The controller may include a processor. The various sensors 7210 include a speed sensor, an acceleration sensor, an engine rotation speed sensor, and the like.

The torque of the engine 7201 is transmitted to the generator 7202, and the torque makes it possible to reserve, in the battery 7208, the electric power generated by the generator 7202.

When the hybrid vehicle is decelerated by a braking mechanism, not shown, the resistance force during the deceleration is applied as torque to the electric power-driving force conversion device 7203, and the regenerative electric power generated by the electric power-driving force conversion device 7203 is reserved in the battery 7208 by the torque.

The battery 7208 is connected to a power source outside the hybrid vehicle, thereby making it also possible to receive electric power supply from the external power supply with the charging port 211 as an input port, and then reserve the received power.

Although not shown, the vehicle may be provided with an information processing device that performs information processing related to vehicle control, based on information on the secondary battery. Examples of such an information processing device include, for example, an information processing device that displays the remaining battery level, based on information on the remaining level of the battery.

It should be understood that as an example, the series hybrid vehicle has been described above, which runs on the motor with the use of the electric power generated by the generator driven by the engine, or the electric power stored once in the battery. However, the present disclosure can be also effectively applied to parallel hybrid vehicles which use the outputs of both an engine and a motor as a driving source, and appropriately switch three systems of running on only the engine, running on only the motor, and running on the engine and the motor. Furthermore, the present disclosure can be also effectively applied to so-called electric vehicles that run on driving by only a driving motor without using any engine.

An example of the hybrid vehicle 7200 to which the technique according to the present disclosure can be applied has been described above. The technology according to the present disclosure can be suitably applied to the battery 7208 in the configuration described above.

Figure 7:
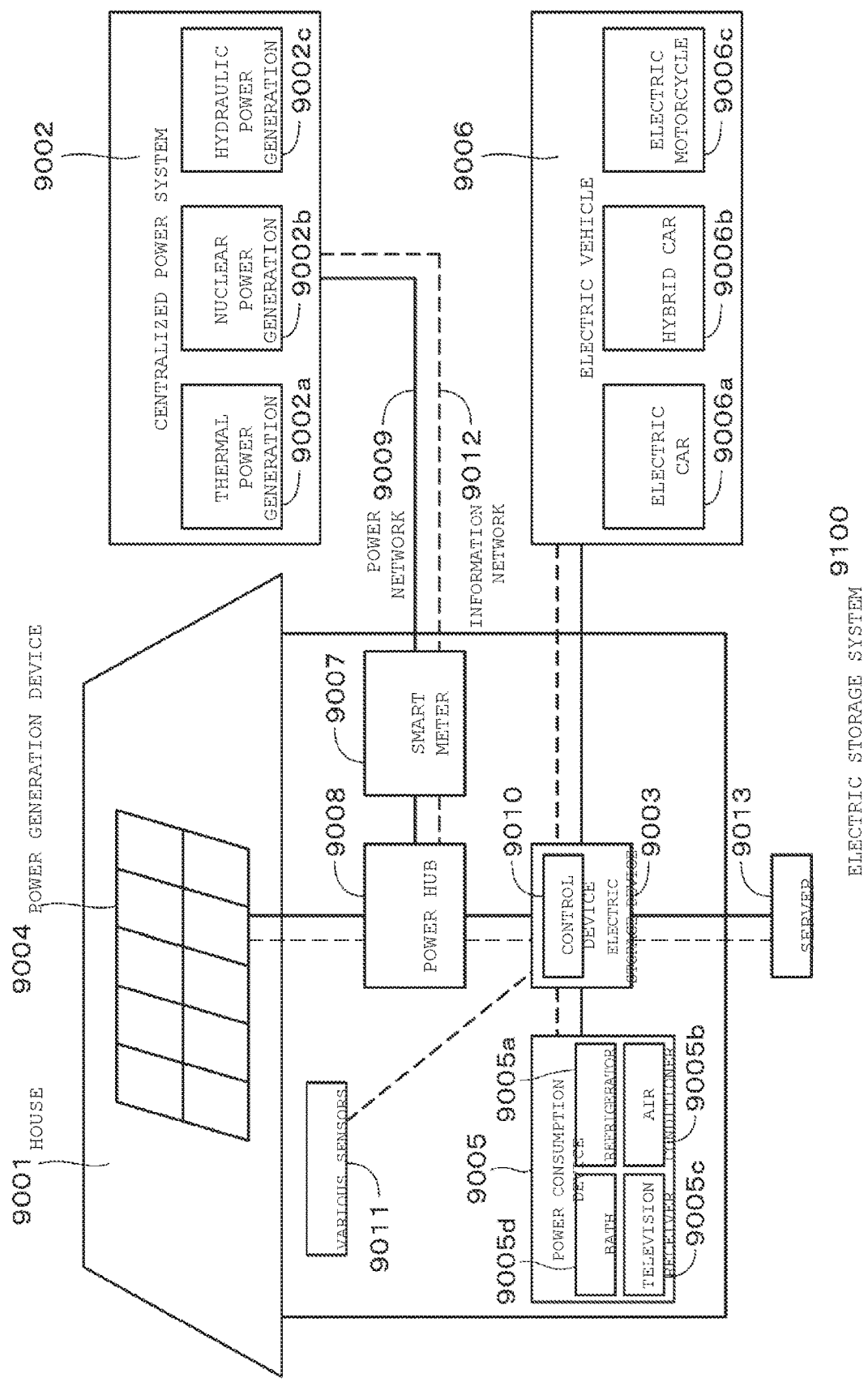
FIG. 7 is a schematic diagram illustrating an example of the configuration of an electric storage system in a house as an application example according to an embodiment of the present technology.

An example of applying the present disclosure to a residential electric storage system will be described with reference to FIG. 7. For example, in an electric storage system 9100 for a house 9001, electric power is supplied to an electric storage device 9003 via a power network 9009, an information network 9012, a smart meter 9007, a power hub 9008, and the like, from a centralized power system 9002 such as a thermal power generation 9002a, a nuclear power generation 9002b, and a hydraulic power generation 9002c.

At the same time, electric power is supplied to the electric storage device 9003 from an independent power source such as a home power generation device 9004. The electric power supplied to the electric storage device 9003 is stored. Electric power for use in the house 9001 is supplied through the use of the electric storage device 9003. The same electric storage system can be used not only for the house 9001 but also for buildings.

The house 9001 is provided with the power generation device 9004, a power consumption device 9005, the electric storage device 9003, a control device 9010 for controlling the respective devices, the smart meter 9007, and sensors 9011 for acquiring various types of information. The respective devices are connected by the power network 9009 and the information network 9012. As the power generation device 9004, a solar cell, a fuel cell, or the like is used, and electric power generated is supplied to the power consumption device 9005 and/or the electric storage device 9003. The power consumption device 9005 refers to a refrigerator 9005a, an air conditioner 9005b, a television receiver 9005c, a bath 9005d, and the like. Furthermore, the power consumption device 9005 includes an electric vehicle 9006. The electric vehicle 9006 refers to an electric car 9006a, a hybrid car 9006b, and an electric motorcycle 9006c.

The above-described battery unit according to the present disclosure is applied to the electric storage device 9003. The electric storage device 9003 is composed of a secondary battery or a capacitor.

For example, the device is composed of a lithium-ion battery. The lithium ion battery may be stationary or may be used in the electric vehicle 9006. The smart meter 9007 has the function of measuring the commercial power usage and transmitting the measured usage to the electric power company. The power network 9009 may be any one or combination of direct-current power feeding, alternate-current power feed, and contactless power feeding.

The various sensors 9011 are, for example, a human sensor, an illuminance sensor, an object detection sensor, a power consumption sensor, a vibration sensor, a contact sensor, a temperature sensor, an infrared sensor, and the like. Information acquired by the various sensors 9011 is transmitted to the control device 9010. With the information from the sensor 9011, weather condition, the human condition, etc. can be grasped to control the power consumption device 9005 automatically controlled, and thus minimize the energy consumption. Furthermore, the control device 9010 can transmit information on the house 9001 to an external electric power company or the like via the Internet.

The power hub 9008 performs processing such as power line branching and DC/AC conversion. Examples of the communication method of the information network 9012 connected to the control device 9010 include a method of using a communication interface such as a UART (Universal Asynchronous Receiver-Transmitter: transmission/reception circuit for asynchronous serial communication), and a method of using a sensor network in accordance with a wireless communication standard, such as Bluetooth (registered trademark), ZigBee, and Wi-Fi. The Bluetooth system, which is applied to multimedia communication, can perform one-to-many connection communication. The ZigBee uses the physical layer of the IEEE (Institute of Electrical and Electronics Engineers) 802.15.4. The IEEE 802.15.4 is a name of a short range wireless network standard referred to as PAN (Personal Area Network) or W (Wireless) PAN.

The control device 9010 is connected to an external server 9013. This server 9013 may be managed by any of the house 9001, an electric power company, and a service provider. The information transmitted and received by the server 9013 is, for example, power consumption information, life pattern information, power charges, weather information, natural disaster information, and information on electric power trade. These pieces of information may be transmitted and received from a power consumption device (for example, a television receiver) in the home, but may be transmitted and received from a device outside the home (for example, a mobile phone). These pieces of information may be displayed on a device that has a display function, for example, a television receiver, a mobile phone, a PDA (Personal Digital Assistants), or the like.

The control device 9010 (controller) that controls each unit includes a CPU (Central Processing Unit), a RAM (Random Access Memory), a ROM (Read Only Memory), a processor, or the like, and stored in the electric storage device 9003 in this example. The control device 9010 connected to the electric storage device 9003, the home power generation device 9004, the power consumption device 9005, the various sensors 9011, the server 9013 via the information network 9012, has the function of regulating, for example, the commercial power usage and the power generation. Further, the device may have a function such as handling a power trade in the power market.

As described above, the electric storage device 9003 can store therein electric power generated by not only the centralized power system 9002 such as the thermal power 9002a, the nuclear power 9002b, and the hydraulic power 9002c, but also the home power generation device 9004 (solar power generation, wind power generation).

Therefore, even if the home power generation device 9004 fluctuates in generated power, it is possible to achieve control such as making the amount of power sent to the outside constant or discharging the power as needed. For example, the system can be also used such that electric power obtained by solar power generation is stored in the electric storage device 9003, and at night, night-time power at a lower rate is stored in the electric storage device 9003, and then, the power stored by the electric storage device 9003 is discharged and used in the daytime at a higher rate.

It should be understood that while an example of the control device 9010 stored in the electric storage device 9003 has been described in this example, the control device 9010 may be stored in the smart meter 9007, or may be configured alone. Furthermore, the electric storage system 9100 may be used for multiple homes in multiple dwelling houses, or may be used for multiple detached houses.

An example of the electric storage system 9100 to which the technology according to the present disclosure can be applied has been described above. The technology according to the present disclosure can be suitably applied to the secondary battery of the electric storage device 9003 in the configuration described above.

Hereinafter, the present technology will be specifically described with reference to examples, but the present technology is not to be considered limited to only these examples.

Example 1A

First, lithium carbonate ($Li_2CO_3$), cobalt carbonate ($CoCO_3$), aluminum oxide ($Al_2O_3$), and magnesium oxide (MgO) as raw materials were mixed so as to have a molar ratio of Li:Co:Al:Mg=1:0.98:0.01:0.01, and then subjected to firing in the air at 900° C. for 5 hours to obtain a lithium composite oxide ($LiCo_{0.98}Al_{0.01}Mg_{0.01}O_2$) as a positive electrode active material.

Next, a solution was prepared by dissolving lithium hydroxide monohydrate and aluminum isopropoxide in ethanol for a molar ratio of lithium hydroxide monohydrate: aluminum isopropoxide=0.5:1, and a bath was filled with this solution. Subsequently, the positive electrode active material was put into the bath so that the positive electrode active material and the ethanol met a mass ratio of positive electrode active material:ethanol=1:1.5. In this regard, the input of the positive electrode active material was adjusted so that aluminum isopropoxide was 0.1% by mass with respect to the positive electrode active material. Thereafter, the bath was stirred with a stirrer at 900 rpm for 3 h, and the solution was filtered and dried to obtain a positive electrode material. Further, for use in a composition analysis to be described later, the filtrate obtained in the foregoing filtration step was partially collected.

The composition of the positive electrode material obtained in the way described above was identified as follows. First, a trace amount of precipitate was obtained by drying the filtrate collected in the above-mentioned step of preparing the positive electrode material. Next, a diffraction pattern of this precipitate was measured by an X-ray diffractometer, and this analysis pattern was compared with the ICDD (International Centre for Diffraction Data (registered trademark)) data as a standard data collection of X-ray diffraction to identify the composition of the precipitate. As a result, it was confirmed that the precipitate was $LiAl_2(OH)_7 \cdot 2H_2O$ with crystalline peaks at 23.5° and 36.0° in the range of the diffraction angle 2θ from 15° to 80°. It is to be noted that when the aluminum isopropoxide and the lithium hydroxide monohydrate are all reacted, the content of $LiAl_2(OH)_7 \cdot 2H_2O$ with respect to the positive electrode active material is 0.05% by mass.

Figure 8A:
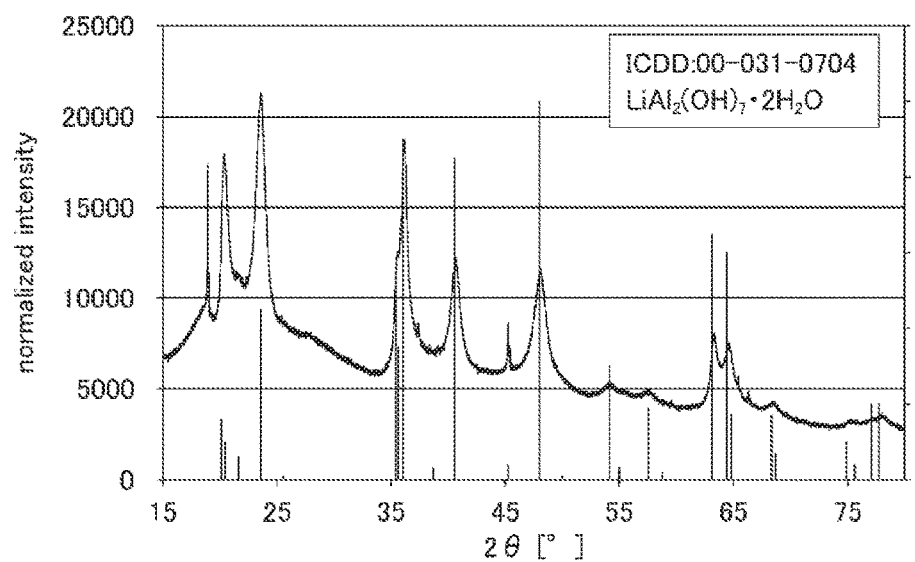
FIG. 8A is a spectrum diagram showing a diffraction pattern of a precipitate and the diffraction pattern of $Li_xAl_2(OH)_{7-y} \cdot zH_2O$ listed in ICDD.
Figure 8B:
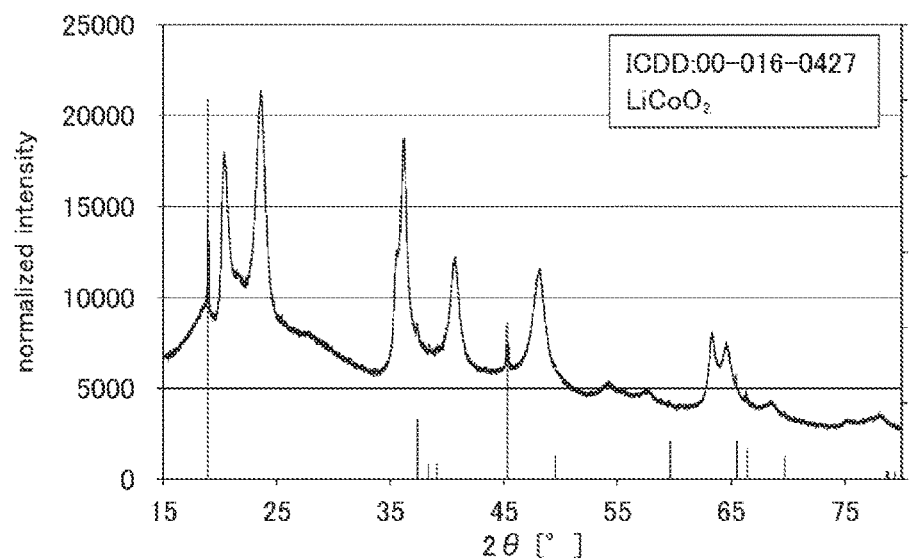
FIG. 8B is a spectrum diagram showing a diffraction pattern of a precipitate and the diffraction pattern of $LiCoO_2$ listed in the ICDD.

FIG. 8A shows the diffraction pattern of the precipitate (Example 1A) obtained from the X-ray diffractometer and the diffraction pattern of $LiAl_2(OH)_7 \cdot 2H_2O$, listed on the ICDD card number 00-031-0704. FIG. 8B shows the diffraction pattern of the precipitate (Example 1A) obtained from the X-ray diffractometer and the diffraction pattern of $LiCoO_2$ listed on the ICDD card number 00-016-0427. In FIGS. 8A and 8B, the discrete diffraction patterns are listed on ICDD.

Since $H_2O$ is crystallization water, $H_2O$ remains as it is in the case of drying at about 120° C., and in the case of further drying at much higher temperatures, $H_2O$ is reduced, thereby finally leading to the absence of $H_2O$. The $LiAl_2(OH)_7 \cdot 2H_2O$ deviates slightly depending on the synthesis conditions, but can be regarded as the same material as long as the crystal structure of $Li_xAl_2(OH)_{7-y} \cdot zH_2O$ ($0.9 < x < 1.1$, $-0.1 < y < 0.1$, $0 \leq z < 2.1$) is not changed.

It should be understood that the composition of the positive electrode material was analyzed with the use of the filtrate as described above, because a trace amount of $LiAl_2(OH)_7 \cdot 2H_2O$ can be easily analyzed by a common X-ray diffractometer. Further, it is also possible to analyze the composition directly from the positive electrode active material if a high-intensity synchrotron X-ray diffractometer is used which is possessed by Spring 8 or the like.

From the foregoing analysis results, it is determined that the positive electrode material contains $LiAl_2(OH)_7 \cdot 2H_2O$. Specifically, it is determined that the positive electrode material is a mixture including positive electrode active material particles with surfaces covered with $LiAl_2(OH)_7 \cdot 2H_2O$ and $LiAl_2(OH)_7 \cdot 2H_2O$ present without covering the surfaces of the positive electrode active material particles.

Examples 2A to 4A

Except for adjusting the blending amounts of aluminum isopropoxide and lithium hydroxide monohydrate such that when the aluminum isopropoxide and the lithium hydroxide monohydrate were all reacted, the content of $LiAl_2(OH)_7 \cdot 2H_2O$ with respect to the positive electrode active material was 1 to 5% by mass, a positive electrode material was obtained in the same manner as in Example 1A.

Example 5A

Lithium carbonate ($Li_2CO_3$) and cobalt carbonate ($CoCO_3$) as raw materials were mixed so as to have a molar ratio of Li:Co=1:1, and then subjected to firing in the air at 900° C. for 5 hours to obtain a lithium composite oxide ($LiCoO_2$) as a positive electrode active material. The subsequent process was carried out in the same manner as in Example 1 to obtain a positive electrode material.

Example 6A

Lithium carbonate ($Li_2CO_3$) and manganese carbonate ($MnCO_3$) as raw materials were mixed so as to have a molar ratio of Li:Mn=1:2, and then subjected to firing in the air at 750° C. for 5 hours to obtain a lithium composite oxide ($LiMn_2O_4$) as a positive electrode active material. The subsequent process was carried out in the same manner as in Example 1 to obtain a positive electrode material.

Example 7A

Lithium carbonate ($Li_2CO_3$), nickel hydroxide $Ni(OH)_2$, cobalt carbonate ($CoCO_3$), and manganese carbonate ($MnCO_3$) as raw materials were mixed so as to have a molar ratio of Li:Ni:Co:Mn=1:0.5:0.2:0.3, and then subjected to firing in the air at 850° C. for 5 hours to obtain a lithium composite oxide ($LiNi_{0.5}Co_{0.2}Mn_{0.3}O_2$) as a positive electrode active material. The subsequent process was carried out in the same manner as in Example 1 to obtain a positive electrode material.

Example 8A

Lithium carbonate ($Li_2CO_3$), nickel hydroxide $Ni(OH)_2$, cobalt carbonate ($CoCO_3$), and aluminum oxide ($Al_2O_3$) as raw materials were mixed so as to have a molar ratio of Li:Ni:Co:Al=1:0.75:0.2:0.05, and then subjected to firing in the air at 800° C. for 5 hours to obtain a lithium composite oxide ($LiNi_{0.75}Co_{0.2}Al_{0.05}O_2$) as a positive electrode active material. The subsequent process was carried out in the same manner as in Example 1 to obtain a positive electrode material.

Comparative Example 1A

In the same way as in Example 1A, $LiCo_{0.98}Al_{0.01}Mg_{0.01}O_2$ was obtained as a positive electrode active material. This positive electrode active material was adopted as a positive electrode material.

Comparative Example 2A

In the same way as in Example 5A, $LiCoO_2$ was obtained as a positive electrode active material. This positive electrode active material was adopted as a positive electrode material.

Comparative Example 3A

In the same way as in Example 6A, $LiMn_2O_4$ was obtained as a positive electrode active material. This positive electrode active material was adopted as a positive electrode material.

Comparative Example 4A

In the same way as in Example 7A, $LiNi_{0.5}Co_{0.2}Mn_{0.3}O_2$ was obtained as a positive electrode active material. This positive electrode active material was adopted as a positive electrode material.

Comparative Example 5A

In the same way as in Example 8A, $LiNi_{0.75}Co_{0.2}Al_{0.05}O_2$ was obtained as a positive electrode active material. This positive electrode active material was adopted as a positive electrode material.

Examples 1B to 8B, Comparative Examples 1B to 5B

Laminate film type lithium ion secondary batteries were prepared with the use of the positive electrode materials according to Examples 1A to 8A and Comparative Examples 1A to 5A, obtained in the ways as described above.

Single-side coating samples of the positive and negative electrodes described below were prepared separately, and the charge capacity was evaluated with respect to a coin cell with a counter electrode Li for each electrode. In the case of the positive electrode, the electric capacity was measured in the case of charging up to a predetermined initial charging voltage (initial charging voltage: 4.4 V for the coin cells with the counter electrode Li with the use of the positive electrode materials according to Examples 1A to 5A, Example 7A, and Comparative Examples 1A, 2A, and 4A; initial charging voltage: 4.3 V for the coin cells with counter electrode Li with the use of the positive electrode materials according to Examples 6A and 8A and Comparative Examples 3A and 5A), whereas in the case of the negative electrode, the electric capacity was measured in the case of, after 0 V at a constant current, applying constant-voltage charging until the current value reached 1/10 of the constant current value, and the charge capacity per combination thickness was obtained for each electrode. With the use of the foregoing values, the thickness of each electrode was adjusted by the solid content of the electrode slurry, the speed of applying the slurry, or the like such that the charge capacity of the positive electrode/the charge capacity of the negative electrode was 0.9.

The positive electrodes were prepared as follows. First, the positive electrode materials according to Examples 1A to 8A and Comparative Examples 1A to 5A, obtained in the way described above, an amorphous carbon powder (Ketjen black), and polyvinylidene fluoride (PVdF) were mixed at a mass ratio of 95:2:3 to prepare positive electrode combinations. Next, this positive electrode combination was dispersed in N-methyl-2-pyrrolidone (NMP) to prepare a positive electrode combination slurry, and this positive electrode combination slurry was applied uniformly to both sides of a 10 μm-thick band-shaped aluminum foil (positive electrode current collector). Subsequently, the coated product obtained was subjected to hot-air drying, and then compression molding by a roll press machine to form a positive electrode sheet. Thereafter, this positive electrode sheet was cut into a band shape of 70 mm×800 mm to prepare a positive electrode. Finally, a positive electrode lead was attached to an exposed part of the positive electrode current collector of the positive electrode.

The negative electrode was prepared as follows. First, a mixture obtained by mixing 90% by mass of Si alloy particles and 10% by mass of graphite was prepared as a negative electrode active material. Next, a negative electrode combination was prepared by mixing 90% by mass of the negative electrode active material and 10% by mass of polyvinylidene fluoride (PVdF). Then, this negative electrode combination was dispersed in N-methyl-2-pyrrolidone (NMP) to prepare a negative electrode combination slurry, and this negative electrode combination slurry was applied uniformly to both sides of a 10 μm-thick band-shaped copper foil (negative electrode current collector). Thereafter, the coated product obtained was subjected to hot-air drying, and then compression molding by a roll press machine to form a negative electrode sheet. Subsequently, this negative electrode sheet was cut into a band shape of 72 mm×810 mm to prepare a negative electrode. Finally, a negative electrode lead was attached to an exposed part of the negative electrode current collector of the negative electrode.

A laminate film type lithium ion secondary battery was prepared in the following way. First, the prepared positive electrode and negative electrode were attached firmly with a separator composed of a microporous polyethylene film with a thickness of 25 μm, wound in a longitudinal direction, and a protective tape was attached to the outermost circumferential part, thereby forming a wound electrode body. Subsequently, the wound electrode body was loaded between exterior members, and three sides of the exterior members were heat-sealed, while the other side was not heat-sealed so as to have an opening. Moisture proof aluminum laminate films with a 25 μm thick nylon film, 40 μm thick aluminum foil, and a 30 μm thick polypropylene film laminated in order from the outermost layer were used as the exterior members.

First, a mixed solvent was prepared by mixing ethylene carbonate (EC) and ethylmethyl carbonate (EMC) such that the mass ratio was EC:EMC=5:5. Next, an electrolytic solution was prepared by dissolving, in the mixed solvent, lithium hexafluorophosphate ($LiPF_6$) as an electrolyte salt so as to reach 1 mol/l. This electrolytic solution was injected from the opening of the exterior members, the remaining side of the exterior members was heat-sealed under reduced pressure, and thus hermetically sealed. Thus, an intended laminate film-type lithium ion secondary battery was obtained.

The positive electrode materials according to Examples 1A to 8A and Comparative Examples 1A to 5A, obtained in the way described above, and the secondary batteries according to Examples 1B to 8B and Comparative Examples 1B to 5B were evaluated as follows.

The exothermic reaction of the positive electrode material was examined by differential scanning calorimetry (DSC). As a result, it has been confirmed that the positive electrode materials according to Examples 1A to 4A have maximum exothermic peaks reduced as compared with the positive electrode material according to Comparative Example 1A. Similarly, it has been confirmed that the positive electrode materials according to Examples 5A to 8A respectively have maximum exothermic peaks reduced as compared with the positive electrode materials according to Comparative Examples 2A to 5A. As a result, it has been found that the positive electrode materials according to Examples 1A to 8A have high resistance to rapid heat generation as compared with the positive electrode materials according to Comparative Examples 1A to 5A.

The secondary batteries were charged and discharged in the following manner to obtain the discharge capacity. More specifically, under an environment at 23° C., the secondary batteries were charged at a constant current of 0.2C until the battery voltages reached 4.35 V (4.25 V for the secondary batteries according to Examples 6B and 8B), and then, the secondary batteries were charged at a constant voltage until the current values reached 0.01C at a constant voltage of 4.35 V (4.25 V for the secondary batteries according to Examples 6B and 8B). Thereafter, the secondary batteries were discharged at a constant current of 0.2C until the battery voltages reached 3.0 V. The discharging capacities of the secondary batteries according to Examples 1B to 8B and Comparative Examples 2B to 5B, obtained in the wat described above, were expressed by an index where the discharge capacity of the secondary battery according to Comparative Example 1B, obtained in the way described above, was regarded as 100.

First, three secondary batteries according to each of Examples 1B to 8B and Comparative Examples 1B to 5B were prepared, and charged in the following way. More specifically, the secondary batteries were charged at a constant current of 0.2C until reaching 4.20 V, and then the secondary batteries were charged at a constant voltage of 4.20 V until the current values reached 0.01C. Next, the three secondary batteries according to each of the example and each of the comparative example were all subjected to a nail penetration test.

If even one of the three secondary batteries caused thermal runaway, three secondary batteries according to each of batteries according to Examples 1B to 8B and Comparative Examples 2B to 5B, obtained in the wat described above, were expressed by an index where the discharge capacity retention rate of the secondary battery according to Comparative Example 1B, obtained in the way described above, was regarded as 100.

TABLE 1

| | Lithium Composite Oxide | Content of $Li_xAl_2(OH)_7 \cdot 2H_2O$ [% by mass] | Discharging Capacity | Cycle Characteristics | Voltage at which No Thermal Runaway was Caused by Wall Penetration Test [V] |
|---|---|---|---|---|---|
| Example 1B | $LiCo_{0.98}Al_{0.01}Mg_{0.01}O_2$ (Example 1A) | 0.05 | 99.9 | 101 | 4.30 |
| Example 2B | $LiCo_{0.98}Al_{0.01}Mg_{0.01}O_2$ (Example 2A) | 1 | 98.9 | 105 | 4.40 |
| Example 3B | $LiCo_{0.98}Al_{0.01}Mg_{0.01}O_2$ (Example 3A) | 3 | 96.8 | 113 | 4.45 |
| Example 4B | $LiCo_{0.98}Al_{0.01}Mg_{0.01}O_2$ (Example 4A) | 5 | 93.0 | 115 | 4.50 |
| Example 5B | $LiCoO_2$ (Example 5A) | 1 | 98.8 | 106 | 4.25 |
| Example 6B | $LiMn_2O_4$ (Example 6A) | 1 | 98.0 | 110 | 4.30 |
| Example 7B | $LiNi_{0.5}Co_{0.2}Mn_{0.3}O_2$ (Example 7A) | 1 | 98.3 | 108 | 4.40 |
| Example 8B | $LiNi_{0.75}Co_{0.2}Al_{0.05}O_2$ (Example 8A) | 1 | 97.8 | 111 | 4.20 |
| Comparative Example 1B | $LiCo_{0.98}Al_{0.01}Mg_{0.01}O_2$ (Comparative Example 1A) | 0 | 100.0 | 100 | 4.25 |
| Comparative Example 2B | $LiCoO_2$ (Comparative Example 2A) | 0 | 100.0 | 100 | 4.15 |
| Comparative Example 3B | $LiMn_2O_4$ (Comparative Example 3A) | 0 | 100.0 | 100 | 4.20 |
| Comparative Example 4B | $LiNi_{0.5}Co_{0.2}Mn_{0.3}O_2$ (Comparative Expample 4A) | 0 | 100.0 | 100 | 4.25 |
| Comparative Example 5B | $LiNi_{0.75}Co_{0.2}Al_{0.05}O_2$ (Comparative Expample 5A) | 0 | 100.0 | 100 | 4.10 |

Examples 1B to 8B and Comparative Examples 1B to 5B were newly prepared, charged in the same manner mentioned above, except that the charging voltage was decreased by 0.05 V, and then subjected to the same nail penetration test as mentioned above. On the other hand, if none of the three secondary batteries caused thermal runaway, three secondary batteries according to each of Examples 1B to 8B and Comparative Examples 1B to 5B were newly prepared, charged in the same manner mentioned above, except that the charging voltage was increased by 0.05 V, and then subjected to the same nail penetration test as mentioned above. The upper limit of the charging voltage at which none of the three secondary batteries caused thermal runaway was determined in accordance with the above-described procedure, and regarded as a voltage at which no thermal runaway was caused by the nail penetration test.

First, the secondary batteries were charged at a constant current of 0.5C until the battery voltages reached 4.35 V (4.25 V for the secondary batteries according to Examples 6B and 8B), and then, the secondary batteries were charged at a constant voltage until the current values reached 0.03C at a constant voltage of 4.35 V (4.25 V for the secondary batteries according to Examples 6B and 8B). Subsequently, the batteries were discharged at a constant current of 0.5C until the battery voltages reached 3.0 V.

This charge/discharge was repeated to calculate the discharge capacity retention rate [%] of the 300-th cycle with respect to the 1st cycle (=(discharge capacity of the 300-th cycle)/(discharge capacity of the 1st cycle)×100). Further, the discharge capacity retention rates of the secondary From Table 1, the following is determined.

The secondary batteries according to Examples 1B to 4B that use the positive electrode materials containing $LiCo_{0.98}Al_{0.01}Mg_{0.01}O_2$ (positive electrode active material) and $LiAl_2(OH)_7 \cdot 2H_2O$ can increase the voltage value at which no thermal runaway was caused, as compared with the secondary battery according to Comparative Example 1B that uses the positive electrode material containing no $LiAl_2(OH)_7 \cdot 2H_2O$. Generally, as the capacity value and charging voltage value of a battery are increased, heat is more likely to be rapidly generated.

The secondary batteries according to Examples 5B to 8B that use the positive electrode active materials other than $LiCo_{0.98}Al_{0.01}Mg_{0.01}O_2$ can also increase the voltage value at which no thermal runaway was caused, as compared with the secondary batteries according to Comparative Examples 2B to 5B that use the positive electrode materials containing no $LiAl_2(OH)_7 \cdot 2H_2O$.

Therefore, the positive electrode active material layer contains $Li_xAl_2(OH)_{7-y} \cdot zH_2O$ (0.9<x<1.1, −0.1<y<0.1, 0≤z<2.1), thereby improving the thermal stability of the positive electrode, and then making it possible to suppress thermal runaway of the secondary battery due to rapid heat generation. In addition, the effect of improving the thermal stability of the positive electrode with the positive electrode active material layer containing therein $Li_x Al_2(OH)_{7-y} \cdot zH_2O$ is not to be considered limited by the type of the positive electrode active material.

With the content of $Li_xAl_2(OH)_{7-y} \cdot zH_2O$ up to 3% by mass, the discharge capacity shows a tendency to decrease almost depending on only the content of $Li_xAl_2(OH)_{7-y}\cdot zH_2O$. However, when the content of $Li_xAl_2(OH)_{7-y}\cdot zH_2O$ exceeds 3% by mass, the discharge capacity shows a tendency to decrease significantly, under not only the large influence of the content alone, but also the large influence of increasing the reaction resistance, with reduced exposed parts of the surfaces of the positive electrode active material particle due to the coating with $Li_xAl_2(OH)_{7-y}\cdot zH_2O$. On the other hand, there is a tendency to decrease the voltage value at which no thermal runaway is caused, as the content of $Li_xAl_2(OH)_{7-y}\cdot zH_2O$ is decreased. Therefore, the content of $Li_xAl_2(OH)_{7-y}\cdot zH_2O$ is preferably 0.05% by mass or higher and 3% by mass or lower.

In a case in which the positive electrode active material is $LiCo_{0.98}Al_{0.01}Mg_{0.01}O_2$ or $LiCoO_2$, the effect of improving the thermal stability of the battery is significantly produced in a secondary battery designed to have the open circuit voltage of higher than 4.15 V or 4.20 V or higher. In a case in which the positive electrode active material is $LiMn_2O_4$, the effect of improving the thermal stability of the battery is significantly produced in a secondary battery designed to have the open circuit voltage of higher than 4.20 V or 4.25 V or higher. In a case in which the positive electrode active material is $LiNi_{0.5}Co_{0.2}Mn_{0.3}O_2$, the effect of improving the thermal stability of the battery is significantly produced in a secondary battery designed to have the open circuit voltage of higher than 4.25 V or 4.30 V or higher. In a case in which the positive electrode active material is $LiNi_{0.75}Co_{0.2}Al_{0.05}O_2$, the effect of improving the thermal stability of the battery is significantly produced in a secondary battery designed to have the open circuit voltage of higher than 4.10 V or 4.15 V or higher.

While the embodiments and examples of the present have been concretely described above, the present technology is not to be considered limited to the embodiments and examples described above, and it is possible to make various modifications based on technical idea of the present technology.

For example, the configurations, methods, steps, shapes, materials, numerical values, and the like cited in the above-described embodiments and examples are considered by way of example only, and configurations, methods, steps, shapes, materials, and numerical values may be used which are different from the foregoing, if necessary.

Further, the configurations, methods, steps, shapes, materials, numerical values, and the like in the above-described embodiments and examples can be combined with each other, without departing from the scope of the present technology.

In addition, in the above-described embodiments and examples, examples of applying the present technology to cylindrical and laminate-film type secondary batteries have been described, but the shape of the battery is not to be considered particularly limited. For example, it is also possible to apply the present technology to secondary batteries such as rectangular or coin-type secondary batteries, and it is also possible to apply the present technology to flexible batteries and the like mounted on wearable terminals such as smartwatches, head-mount displays, and iGlass (registered trademark).

In addition, in the above-described embodiments and examples, examples of applying the present technology to wound types have been described, the structure of the battery is not to be considered particularly limited, and for example, it is also possible to apply to the present technology to a secondary battery that has a structure with a positive electrode and a negative electrode stacked (stacked electrode structure), a secondary battery that has a structure with a positive electrode and a negative electrode folded, and the like.

In addition, in the above-described embodiments and examples, the electrodes (positive electrode and negative electrode) each configured to include a current collector and an active material layer have been described as an example, but the configurations of the electrodes are not to be considered particularly limited. For example, the electrodes may be each configured to be composed of only the active material layer.

In addition, the positive electrode active material layer may be a green compact including the positive electrode material, or may be a sintered body of a green sheet including the positive electrode material. Likewise, the negative electrode active material layer may be also a green compact or a sintered compact of a green sheet.

In addition, the positive electrode material according to the first embodiment may be used for secondary batteries other than lithium ion secondary batteries and lithium ion polymer secondary batteries. For example, the positive electrode material may be used for sodium ion secondary batteries, bulk-type all solid state batteries, and the like.

The present technology is described below in further detail according to an embodiment.

(1)

A battery including:

a positive electrode;

a negative electrode; and an electrolyte, where the positive electrode includes $Li_xAl_2(OH)_{7-y}\cdot zH_2O$ ($0.9<x<1.1$, $-0.1<y<0.1$, $0 \leq z<2.1$).

(2)

The battery according to (1), where the positive electrode includes a positive electrode active material, and particle surfaces of the positive electrode active material are at least partially covered with the $Li_xAl_2(OH)_{7-y}\cdot zH_2O$.

(3)

The battery according to (1), where the positive electrode comprises a positive electrode active material, and the $Li_xAl_2(OH)_{7-y}\cdot zH_2O$ is included separately from the positive electrode active material.

(4)

The battery according to (1), where the $Li_xAl_2(OH)_{7-y}\cdot zH_2O$ is dispersed in the positive electrode.

(5)

The battery according to any of (1) to (4), where the positive electrode includes a positive electrode active material, and the content of the $Li_xAl_2(OH)_{7-y}\cdot zH_2O$ with respect to the positive electrode active material is 0.05% by mass or higher and 3% by mass or lower.

(6)

The battery according to any of (1) to (5), where the $Li_xAl_2(OH)_{7-y}\cdot zH_2O$ has, in a powder X-ray diffraction measurement, at least a crystalline peak at which a diffraction angle 2θ appears at 23.5°±1°, and a crystalline peak at which the diffraction angle 2θ appears at 36.0°±1°.

(7)

The battery according to any of (1) to (6), where the positive electrode includes a lithium composite oxide as a positive electrode active material.

(8)

The battery according to (7), where the lithium composite oxide has a layered rock-salt structure represented by the following Formula (1):

$$Li_rCo_{(1-s)}M5_sO_{(2-t)}F_u \qquad (1)$$

(In Formula (1), M5 represents at least one from the group consisting of nickel, manganese, magnesium, aluminum, boron, titanium, vanadium, chromium, iron, copper, zinc, molybdenum, tin, calcium, strontium and tungsten. r, s, t and u represents values within the ranges of $0.8 \leq r \leq 1.2$, $0 \leq s < 0.5$, $-0.1 \leq t \leq 0.2$, and $0 \leq u \leq 0.1$. The composition of lithium varies depending on the state of charge and discharge, and the value of r represents the value in a fully discharged state), and the open circuit voltage per the pair of positive electrode and negative electrode in a fully charged state falls within a range of higher than 4.15 V and 6.00 V or lower.

(9)

A battery comprising:
a positive electrode;
a negative electrode; and
an electrolyte,
where the positive electrode has, in a powder X-ray diffraction measurement, at least a crystalline peak at which a diffraction angle 2θ appears at 23.5°±1°, and a crystalline peak at which the diffraction angle 2θ appears at 36.0°±1°.

(10)

A positive electrode material including $Li_xAl_2(OH)_{7-y} \cdot zH_2O$ ($0.9 < x < 1.1$, $-0.1 < y < 0.1$, $0 \leq z < 2.1$).

(11)

A positive electrode including $Li_xAl_2(OH)_{7-y} \cdot zH_2O$ ($0.9 < x < 1.1$, $-0.1 < y < 0.1$, $0 \leq z < 2.1$).

(12)

A battery pack including:
the battery according to any of (1) to (9); and
a control unit that controls the battery.

(13)

An electronic device including the battery according to any of (1) to (9),
where the device receives power supply from the battery.

(14)

An electric vehicle including:
the battery according to any of (1) to (9);
a conversion device that receives power supply from the battery to convert the power to a driving force for the vehicle; and
a control device that performs information processing related to vehicle control, based on information on the battery.

(15)

An electric storage device including the battery according to any of (1) to (9),
where the device supplies electric power to an electronic device connected to the battery.

(16)

A power system including the battery according to any of (1) to (9),
where the system receives power supply from the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising:
a positive electrode;
a negative electrode; and
an electrolyte,
wherein the positive electrode includes $Li_xAl_2(OH)_{7-y} \cdot zH_2O$, and wherein $0.9 < x < 1.1$, $-0.1 < y < 0.1$, and $0 \leq z < 2.1$.

2. The battery according to claim 1, wherein
the positive electrode includes a positive electrode active material including a plurality of particles, and
particle surfaces of the positive electrode active material are at least partially covered with the $Li_xAl_2(OH)_{7-y} \cdot zH_2O$.

3. The battery according to claim 1, wherein
the positive electrode further includes a positive electrode active material, and
the $Li_xAl_2(OH)_{7-y} \cdot zH_2O$ is separate from the positive electrode active material.

4. The battery according to claim 1, herein the $Li_xAl_2(OH)_{7-y} \cdot zH_2O$ is dispersed in the positive electrode.

5. The battery according to claim 1, wherein
the positive electrode includes a positive electrode active material, and
a content of the $Li_xAl_2(OH)_{7-y} \cdot zH_2O$ with respect to the positive electrode active material is from 0.05% by mass to 3% by mass.

6. The battery according to claim 1, wherein the $Li_xAl_2(OH)_{7-y} \cdot zH_2O$ has at least a first crystalline peak with a first diffraction angle 2θ at 23.5°±1° and a second crystalline peak with a second diffraction angle 2θ at 36.0°±1° in a powder X-ray diffraction measurement.

7. The battery according to claim 1, wherein the positive electrode includes a positive electrode active material including a lithium composite oxide.

8. The battery according to claim 7, wherein
the lithium composite oxide has a layered rock-salt structure represented by Formula (1):

$$Li_rCo_{(1-s)}M5_sO_{(2-t)}F_u \qquad (1)$$

wherein M5 represents at least one from the group consisting of nickel, manganese, magnesium, aluminum, boron, titanium, vanadium, chromium, iron, copper, zinc, molybdenum, tin, calcium, strontium, tungsten, and combinations thereof, r, s, t and u represent values within ranges of $0.8 \leq r \leq 1.2$, $0 \leq s < 0.5$, $-0.1 \leq t \leq 0.2$, and $0 \leq u \leq 0.1$, and r represents a value in a fully discharged state, and wherein an open circuit voltage per pair of positive electrode and negative electrode in the fully charged state falls within a range of 4.15 V to 6.00 V.

9. A positive electrode material for a battery comprising $Li_xAl_2(OH)_{7-y} \cdot zH_2O$,
wherein $0.9 < x < 1.1$, $-0.1 < y < 0.1$, and $0 \leq z \leq 2.1$.

10. A battery pack comprising:
the battery according to claim 1; and
a controller configured to control the battery.

11. An electronic device comprising the battery according to claim 1,
wherein the electronic device is configured to receive power supply from the battery.

12. An electric vehicle comprising:
the battery according to claim 1;
a converter configured to convert power supplied from the battery to a driving force for the vehicle; and
a controller configured to perform information processing based on information on the battery.

13. An electric storage device comprising the battery according to claim 1,
   wherein the electric storage device is configured to supply power to an electronic device connected to the battery.

14. A power system comprising the battery according to claim 1,
   wherein the power system is configured to receive power supply from the battery.

* * * * *